(12) United States Patent
Zavadsky et al.

(10) Patent No.: US 9,450,689 B2
(45) Date of Patent: Sep. 20, 2016

(54) SYSTEMS AND METHODS FOR DELAY MANAGEMENT IN DISTRIBUTED ANTENNA SYSTEM WITH DIRECT DIGITAL INTERFACE TO BASE STATION

(71) Applicant: ADC Telecommunications, Inc., Berwyn, PA (US)

(72) Inventors: Dean Zavadsky, Shakopee, MN (US); Thomas G. Hebert, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 124 days.

(21) Appl. No.: 14/506,370

(22) Filed: Oct. 3, 2014

(65) Prior Publication Data
US 2015/0098351 A1   Apr. 9, 2015

Related U.S. Application Data

(60) Provisional application No. 61/887,748, filed on Oct. 7, 2013.

(51) Int. Cl.
*H04B 17/364* (2015.01)
*H04W 24/06* (2009.01)
*H04W 88/08* (2009.01)

(52) U.S. Cl.
CPC .......... *H04B 17/364* (2015.01); *H04W 24/06* (2013.01); *H04W 88/085* (2013.01)

(58) Field of Classification Search
CPC ... H04B 17/364; H04B 17/00; H04W 24/06; H04W 88/085
See application file for complete search history.

(56) References Cited

U.S. PATENT DOCUMENTS

| 4,183,054 A | 1/1980 | Patisaul et al. |
| 4,611,323 A | 9/1986 | Hessenmuller |

(Continued)

FOREIGN PATENT DOCUMENTS

| CN | 1812350 | 8/2006 |
| EP | 0391597 | 10/1990 |

(Continued)

OTHER PUBLICATIONS

The International Bureau of WIPO, "International Preliminary Report on Patentability from PCT Application No. PCT/US2012/042237 mailed Jan. 9, 2014", "from PCT Counterpart of U.S. Appl. No. 13/165,294", Jan. 9, 2014, pp. 1-6, Published in: CH.

(Continued)

*Primary Examiner* — Timothy J Weidner
(74) *Attorney, Agent, or Firm* — Fogg & Powers LLC

(57) ABSTRACT

A method for measuring downlink delay in a radio system includes applying a digital representation of a Gaussian pulse to a digital interface of the radio system; marking the digital representation of the Gaussian pulse with respect to a frame of digital data with a marker; propagating the Gaussian pulse in the radio system to an antenna, the radio system configured to convert the digital representation of the Gaussian pulse to a radio frequency signal transmitted at the antenna; measuring when the Gaussian pulse occurs in the radio frequency signal based on the marker; and determining a downlink propagation delay for the radio system between application of the digital representation of the Gaussian pulse at the digital interface and transmission of the radio frequency signal at the antenna.

59 Claims, 10 Drawing Sheets

(56) References Cited

U.S. PATENT DOCUMENTS

| | | |
|---|---|---|
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |
| 5,506,847 A | 4/1996 | Shobatake |
| 5,805,983 A | 9/1998 | Naidu et al. |
| 6,205,120 B1 | 3/2001 | Packer |
| 6,430,160 B1 | 8/2002 | Smith et al. |
| 6,539,026 B1 | 3/2003 | Waclawsky |
| 6,597,678 B1 | 7/2003 | Kuwahara et al. |
| 6,647,210 B1 | 11/2003 | Toyoda et al. |
| 6,690,892 B1 | 2/2004 | Effenberger |
| 6,700,893 B1 | 3/2004 | Radha et al. |
| 6,791,949 B1 | 9/2004 | Ryu et al. |
| 6,952,181 B2 | 10/2005 | Karr et al. |
| 6,977,942 B2 | 12/2005 | Raisanen |
| 7,035,210 B2 | 4/2006 | Walles |
| 7,058,050 B2 | 6/2006 | Johansson et al. |
| 7,113,536 B2 | 9/2006 | Alriksson et al. |
| 7,161,926 B2 | 1/2007 | Elson et al. |
| 7,184,920 B2 | 2/2007 | Sunden et al. |
| 7,546,138 B2 | 6/2009 | Bauman |
| 8,050,246 B2 | 11/2011 | Wala et al. |
| 8,224,233 B2 | 7/2012 | Brisebois et al. |
| 8,428,550 B2 | 4/2013 | Larsen |
| 2003/0041294 A1 | 2/2003 | Moll et al. |
| 2003/0185571 A1 | 10/2003 | Lee et al. |
| 2004/0165532 A1 | 8/2004 | Poor et al. |
| 2005/0137814 A1 | 6/2005 | Kelly et al. |
| 2006/0037069 A1 | 2/2006 | Fisher et al. |
| 2006/0274664 A1 | 12/2006 | Pandya |
| 2007/0064618 A1 | 3/2007 | Garcia et al. |
| 2007/0274377 A1 | 11/2007 | Yeh et al. |
| 2008/0194226 A1 | 8/2008 | Rivas et al. |
| 2009/0046586 A1 | 2/2009 | Stuart et al. |
| 2010/0008250 A1 | 1/2010 | Nomura et al. |
| 2010/0202356 A1 | 8/2010 | Fischer et al. |
| 2010/0226296 A1 | 9/2010 | Wala et al. |
| 2010/0245139 A1 | 9/2010 | Arknaes-Pedersen et al. |
| 2011/0039497 A1 | 2/2011 | Hammarwall et al. |
| 2011/0122772 A1 | 5/2011 | Stuart |
| 2012/0218911 A1 | 8/2012 | Zhu et al. |
| 2012/0257516 A1 | 10/2012 | Pazhyannur et al. |
| 2012/0264377 A1 | 10/2012 | Seelenfreund et al. |
| 2012/0327800 A1 | 12/2012 | Kim et al. |

FOREIGN PATENT DOCUMENTS

| | | |
|---|---|---|
| KR | 1019950704866 | 10/2002 |
| KR | 1020030001491 | 1/2003 |
| KR | 1020030059259 | 7/2003 |
| KR | 1020050078176 | 8/2005 |
| WO | 9115927 | 10/1991 |

OTHER PUBLICATIONS

International Searching Authority, "International Search Report from PCT Application No. PCT/US2012/042237", "from Foreign Counterpart of U.S. Appl. No. 13/165,294", Jan. 23, 2013, pp. 1-9, Published in: WO.

Chinese Patent Office, "Second Office Action for CN Application No. 200880103706.3", "from Foreign Counterpart of U.S. Appl. No. 11/839,086", Sep. 7, 2012, pp. 1-18, Published in: CN.

Chinese Patent Office, "Third Office Action for CN Application No. 200880103706.3", "from Foreign Counterpart of U.S. Appl. No. 11/839,086", Apr. 8, 2013, pp. 1-24, Published in: CN.

Chile Patent Office, "Office Action for Application No. 2402-08", "from Foreign Counterpart of U.S. Appl. No. 11/839,086", Feb. 7, 2010, pp. 1-8, Published in: CL.

Chile Patent Office, "Second Office Action for Application No. 2402-08", "from Foreign Counterpart of U.S. Appl. No. 11/839,086""At least as early as Oct. 6, 2010", , pp. 1-5, Published in: CL.

Chinese Patent Office, "First Office Action for CN Application No. 200880103706.3", "from Foreign Counterpart of U.S. Appl. No. 11/839,086", Jan. 18, 2012, pp. 1-9 Published in: CN.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

International Searching Authority, "International Search Report from PCT Application No. PCT/US2008/072953", "from Foreign Counterpart of U.S. Appl. No. 11/839,086", Feb. 19, 2009, pp. 1-13, Published in: WO.

International Searching Authority, "International Search Report and Written Opinion for Application Serial No. PCT/US2014/059369", "from Foreign Counterpart to U.S. Appl. No. 14/506,370", Jan. 8, 2015, pp. 1-10, Published in: WO.

SYSTEMS AND METHODS FOR DELAY MANAGEMENT IN DISTRIBUTED ANTENNA SYSTEM WITH DIRECT DIGITAL INTERFACE TO BASE STATION

CROSS-REFERENCE TO RELATED APPLICATIONS

This application claims the benefit of U.S. Provisional Patent Application Ser. No. 61/887,748 filed on Oct. 7, 2013, which is hereby incorporated herein by reference.

BACKGROUND

Distributed Antenna Systems (DAS) are used to distribute wireless signal coverage into buildings or other substantially closed environments. The antennas are typically connected to a radio frequency (RF) signal source, such as a service provider's base station. Various methods of transporting the RF signal from the RF signal source to the antenna have been implemented in the art.

SUMMARY

A method for measuring downlink delay in a radio system includes applying a digital representation of a Gaussian pulse to a digital interface of the radio system; marking the digital representation of the Gaussian pulse with respect to a frame of digital data with a marker; propagating the Gaussian pulse in the radio system to an antenna, the radio system configured to convert the digital representation of the Gaussian pulse to a radio frequency signal transmitted at the antenna; measuring when the Gaussian pulse occurs in the radio frequency signal based on the marker; and determining a downlink propagation delay for the radio system between application of the digital representation of the Gaussian pulse at the digital interface and transmission of the radio frequency signal at the antenna.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1A:
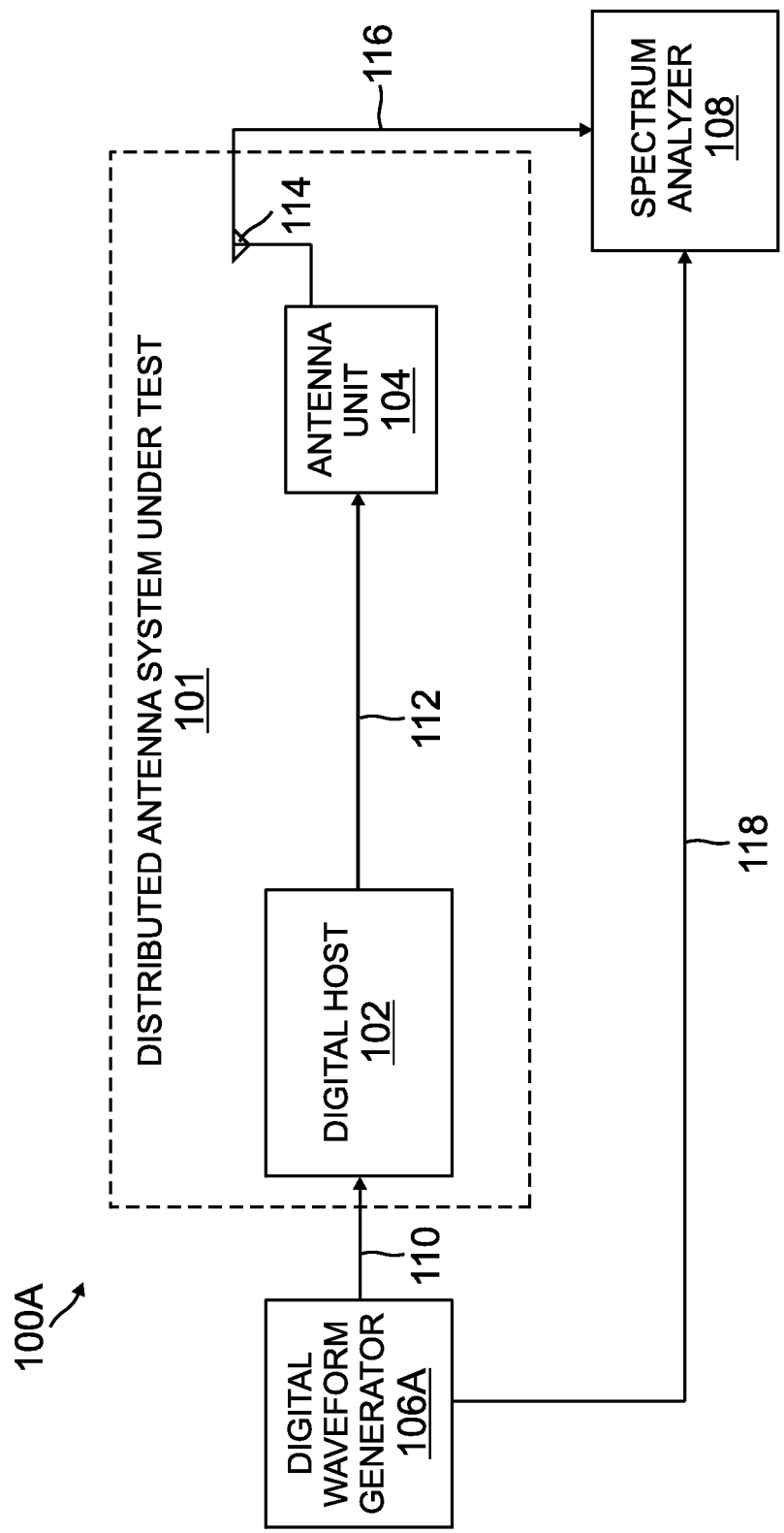
FIGS. 1A-1D are block diagrams of exemplary embodiments of systems for measuring downlink and uplink delays in distributed antenna systems.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below describe methodology and a system to measure delay between different domains, such as (1) a digital input to an analog radio frequency (RF) output; and (2) a radio frequency (RF) input to a digital output. More specifically, the embodiments described below describe a distributed antenna system under test and components within the distributed antenna system under test including at least one digital host communicatively coupled to at least one antenna unit via a communication medium. In exemplary embodiments, a digital interface of the digital host is at least one of a Common Public Radio Interface (CPRI) base station interface, an Open Base Station Architecture Initiative (OBSAI) base station interface, and an Open Radio Interface (ORI) base station interface. In exemplary embodiments, the antenna unit includes an antenna. In exemplary embodiments, test equipment is communicatively coupled to both the digital interface and the antenna to aid in determining the downlink and uplink delay in the distributed antenna system under test.

In exemplary embodiments, the antenna unit is multi-standard and capable of receiving at least one signal and converting it to radio frequency (RF) and transmitting it using at least one antenna. In exemplary embodiments, the antenna unit is not specific to a number of channels or an air protocol and does not necessarily require any hardware change when channels are added or removed, or a new modulation type or air protocol is used. In exemplary embodiments, a plurality of signal interface units convert a plurality of external device signals received from a plurality of external devices and representing individual channels into a single radio system signal that is transported through the distributed switching network to at least one antenna unit that converts the single radio system signal into radio frequency (RF) signals and transmits them using at least one antenna. In exemplary embodiments, the at least one antenna unit includes a single digital/analog convertor and a single RF converter that can up-convert the entire radio system signal into RF spectrum having various channels.

In exemplary embodiments, the digital host is configured to communicate channelized signals with an external device. As described herein, channelized signals are specific to a particular channel. In exemplary embodiments, the channelized signals are baseband data, such as channelized in-phase (I) and quadrature (Q) data in I/Q pairs. The channelized signals are not positioned relative to one another and require additional baseband conversion before RF conversion and transmission can be performed. Specifically, if a system communicated the channelized signals to an antenna unit, additional processing would be required at the antenna unit to convert the channelized signals before RF conversion and transmission.

In contrast, radio system signals are not specific to a particular channel and may include a number of different channels. The radio system signals represent either digitized or analog spectrum and are one step closer to RF signals than the channelized signals. In exemplary embodiments, the radio system signal is at an intermediate frequency that maps to a large portion of RF spectrum including a number of channels. In exemplary embodiments, the radio system signals can simply be up-converted from the intermediate frequency to radio frequency and transmitted at an antenna unit as described below. Thus, the antenna units do not need the capability of processing channelized signals before RF conversion and transmission. Accordingly, in these exemplary embodiments it doesn't matter what channels are sent to the antenna units. In exemplary embodiments, the antenna unit communicates with subscriber units using a first set of channels at first frequencies and a second set of channels at second frequencies. In exemplary embodiments, the antenna unit communicates using different modulation and/or radio access technologies simultaneously.

FIGS. 1A-1D are block diagrams of exemplary embodiments of systems 100 for measuring downlink and uplink delays in a distributed antenna system under test 101, labeled system 100A, system 100B, and system 100C respectively.

FIG. 1A is a block diagram of an exemplary embodiment of a system 100A for measuring downlink delays in a distributed antenna system under test 101. Distributed antenna system under test includes a digital host 102 and an antenna unit 104. System 100A includes a digital waveform generator 106A and a spectrum analyzer 108. The digital host 102 of the distributed antenna system under test 101 is communicatively coupled to the antenna unit 104 by a communication medium 112. In exemplary embodiments, the communication medium 112 is at least one of an optical fiber, coaxial cable, and twisted pair. The antenna unit 104 includes a radio frequency antenna 114.

The digital waveform generator 106A is communicatively coupled to the digital host 102 of the distributed antenna system under test 101 by a communication medium 110. The radio frequency antenna 114 of the antenna unit 104 of the distributed antenna system under test 101 is communicatively coupled to the spectrum analyzer 108 by a communication medium 116. The digital waveform generator 106A is also communicatively coupled directly to the spectrum analyzer 108 through communication medium 118 without going through the distributed antenna system under test 101.

The digital host 102 receives digital signals from the digital waveform generator 106A and communicates digital signals to the antenna unit 104. The antenna unit 104 receives digital signals from the digital host 102 and converts the digital signals into radio frequency signals and transmits them using the radio frequency antenna 114. The spectrum analyzer 108 receives and analyzes the radio frequency signals transmitted using radio frequency antenna 114. The digital waveform generator 106A generates a digital representation of a Gaussian pulse and applies that to a digital interface of the digital host 102. The digital waveform generator 106A marks the digital representation of the Gaussian pulse with respect to a frame of digital data with a marker. The digital host propagates the Gaussian pulse to the antenna unit 104 across the communication medium 112. The antenna unit 104 converts the digital representation of the Gaussian pulse to a radio frequency signal and transmits it at the antenna. The spectrum analyzer 108 measures when the Gaussian pulse occurs in the radio frequency signal based on the marker. In exemplary embodiments, the Gaussian Pulse is used because the shape of the waveform is maintained (particularly the peak), even with multiple stages of filtering (digital and RF), allowing for an accurate delay measurement. In exemplary embodiments, the Gaussian Pulse provides minimal distortion in bandwidth limited radio frequency (RF) channels.

The system 100A is configured to determine a downlink propagation delay for the distributed antenna system under test 101 between application of the digital representation of the Gaussian pulse at the digital interface of the digital host 102 and transmission of the radio frequency signal at the radio frequency antenna 114. In exemplary embodiments, the downlink propagation delay includes both intrinsic delay of the digital host 102 and antenna unit 104 and downlink transmission delay across the communication medium 112. In exemplary embodiments, the system 100A is configured to determine the downlink transmission delay across the communication medium 112 between the digital host 102 and the antenna unit 104. In exemplary embodiments, the system 100A is further configured to subtract the downlink transmission delay from the downlink propagation delay to determine a total intrinsic delay including first intrinsic delay of the digital host 102 and second intrinsic delay of the antenna unit 104.

In exemplary embodiments, the digital waveform generator 106A is configured to provide the marker to the spectrum analyzer 108 via communication medium 118 separate from and bypassing the distributed antenna system under test 101. In exemplary embodiments, the digital host 102 is configured to receive digital signals selected from one of a Common Public Radio Interface (CPRI) external device interface, an Open Base Station Architecture Initiative (OB-SAI) external device interface, and an Open Radio Interface (ORI) external device interface.

In exemplary embodiments, the communication medium 112 is an optical fiber and the communication across the communication medium 112 is optical. In these embodiments, an electrical to optical conversion occurs at the digital host 102 and antenna unit 104. In other embodiments, the communication medium 112 is a conductive cable (such as coaxial cable, twisted pair, etc.) and the communication across the communication medium 112 is electrical. In exemplary embodiments, the communication across the communication medium 112 is digital. In exemplary embodiments, the communication across the communication medium 112 is analog. In exemplary embodiments, any mixture of optical, electrical, analog, and digital communication occurs across the communication medium 110. In exemplary embodiments, the antenna unit 104 includes functionality to convert between digital and analog signals.

Figure 1B:
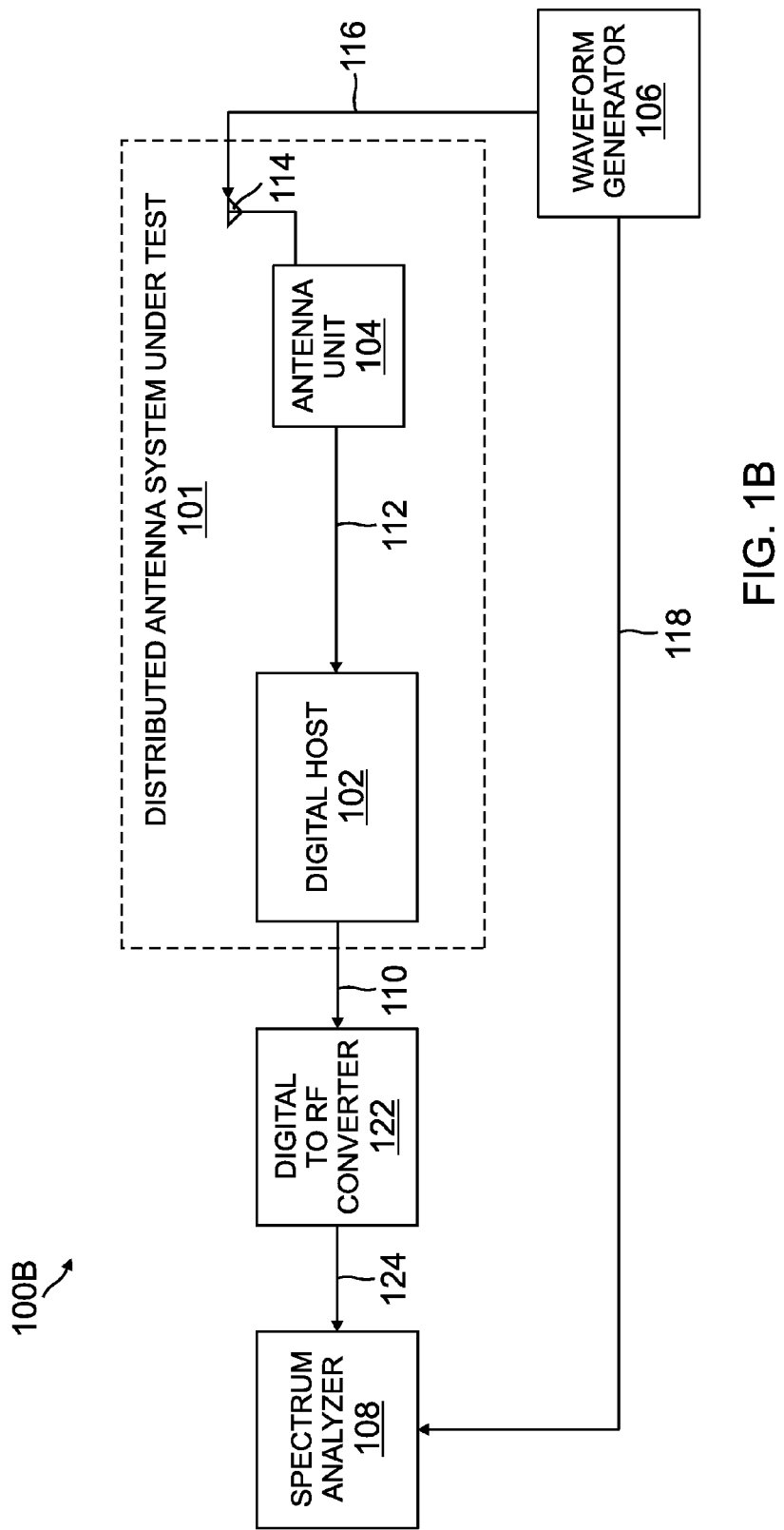

FIG. 1B is a block diagram of an exemplary embodiment of a system 100B for measuring downlink delays in a distributed antenna system under test 101. Distributed antenna system under test includes a digital host 102 and an antenna unit 104. System 100B includes a waveform generator 106, a digital to radio frequency (RF) converter 122, and a spectrum analyzer 108. The digital host 102 of the distributed antenna system under test 101 is communicatively coupled to the antenna unit 104 by a communication medium 112. In exemplary embodiments, the communication medium 112 is at least one of an optical fiber, coaxial cable, and twisted pair. The antenna unit 104 includes a radio frequency antenna 114.

System 100B includes similar components and functionality to system 100A, the difference being that system 100B includes a waveform generator 106 on the radio frequency antenna 114 side and a digital to (radio frequency) RF converter 122 and the spectrum analyzer 108 on the digital host 102 side. The waveform generator 106 is communicatively coupled to the radio frequency antenna 114 of the antenna unit 104 by the communication medium 116. The digital host 102 of the distributed antenna system under test 101 is communicatively coupled to the digital to RF converter 122 by the communication medium 110 and the digital to RF converter 122 is connected to the spectrum analyzer 108 by a communication medium 124. The waveform generator 106 is also communicatively coupled directly to the spectrum analyzer 108 through the communication medium 118 without going through the distributed antenna system under test 101.

The antenna unit 104 receives radio frequency signals from the waveform generator 106, converts them to digital signals, and communicates the digital signals to the digital host 102. The digital host 102 receives digital signals from the antenna unit 104 and communicates them to the digital to RF converter 122. The digital to RF converter 122 converts the digital signals to radio frequency (RF) signals and transmits the RF signals to the spectrum analyzer 108. The spectrum analyzer 108 receives and analyzes the RF signals received from the digital to RF converter 122 based on the digital signals received from the digital host 102. The waveform generator 106 generates a Gaussian pulse and applies that to the radio frequency antenna 114 of the antenna unit 104. The waveform generator 106 marks the Gaussian pulse with respect to a frame of digital data with a marker. The antenna unit 104 propagates the Gaussian pulse to the digital host 102 across the communication medium 112. The digital host 102 outputs the digital representation of the Gaussian pulse to the spectrum analyzer 108. The spectrum analyzer 108 measures when the Gaussian pulse occurs in the digital representation of the Gaussian pulse based on the marker. In exemplary embodiments, the Gaussian Pulse is used because the shape of the waveform is maintained (particularly the peak), even with multiple stages of filtering (digital and RF), allowing for an accurate delay measurement. In exemplary embodiments, the Gaussian Pulse provides minimal distortion in bandwidth limited radio frequency (RF) channels.

The system 100B is configured to determine an uplink propagation delay for the distributed antenna system under test 101 between application of the Gaussian pulse at the radio frequency antenna 114 of the antenna unit 104 and output of the digital representation of the Gaussian pulse at the digital interface of the digital host 102. In exemplary embodiments, the uplink propagation delay includes both intrinsic delay of the digital host 102 and antenna unit 104 and uplink transmission delay across the communication medium 112. In exemplary embodiments, the system 100B is configured to determine the uplink transmission delay across the communication medium 112 between the digital host 102 and the antenna unit 104. In exemplary embodiments, the system 100B is configured to determine the delay through the digital to RF converter 122. In exemplary embodiments, the system 100B is further configured to subtract the uplink transmission delay and the delay through the digital to RF converter 122 from the uplink propagation delay to determine a total uplink intrinsic delay including first intrinsic delay of the digital host 102 and second intrinsic delay of the antenna unit 104.

In exemplary embodiments, the waveform generator 106 is configured to provide the marker to the spectrum analyzer 108 via communication medium 118 separate from and bypassing the distributed antenna system under test 101. In exemplary embodiments, the digital host 102 is configured to output digital signals selected from one of a Common Public Radio Interface (CPRI) external device interface, an Open Base Station Architecture Initiative (OBSAI) external device interface, and an Open Radio Interface (ORI) external device interface.

In exemplary embodiments, the communication medium 112 is an optical fiber and the communication across the communication medium 112 is optical. In these embodiments, an electrical to optical conversion occurs at the digital host 102 and antenna unit 104. In other embodiments, the communication medium 112 is a conductive cable (such as coaxial cable, twisted pair, etc.) and the communication across the communication medium 112 is electrical. In exemplary embodiments, the communication across the communication medium 112 is digital. In exemplary embodiments, the communication across the communication medium 112 is analog. In exemplary embodiments, any mixture of optical, electrical, analog, and digital communication occurs across the communication medium 110. In exemplary embodiments, the antenna unit 104 includes functionality to convert between digital and analog signals.

Figure 1C:
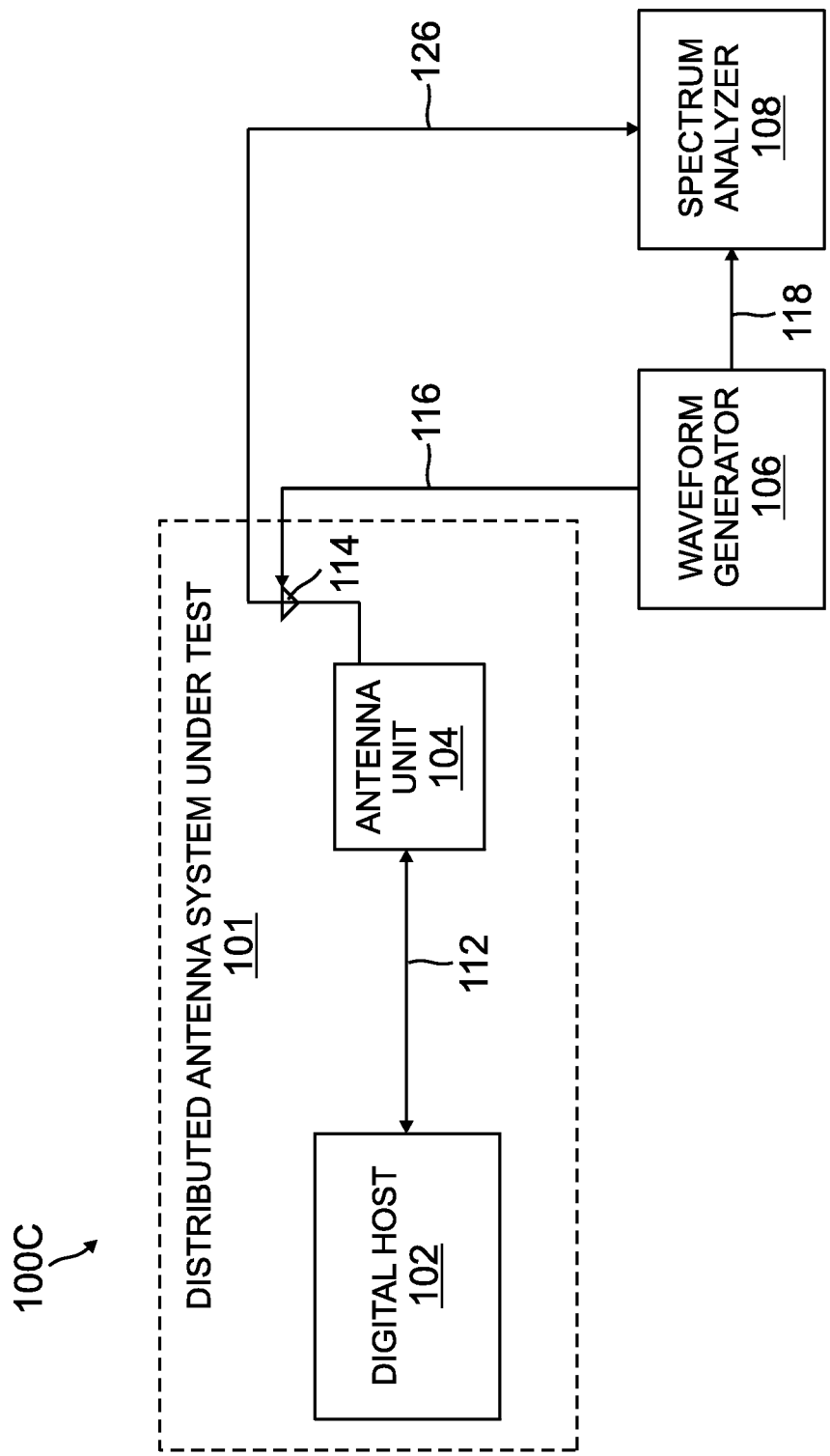

FIG. 1C is a block diagram of an exemplary embodiment of a system 100C for measuring delays in a distributed antenna system under test 101. Distributed antenna system under test 101 includes a digital host 102 and an antenna unit 104. System 100C includes a waveform generator 106 and a spectrum analyzer 108. The digital host 102 of the distributed antenna system under test 101 is communicatively coupled to the antenna unit 104 by a communication medium 112. In exemplary embodiments, the communication medium 112 is at least one of an optical fiber, coaxial cable, and twisted pair. The antenna unit 104 includes a radio frequency antenna 114.

System 100C includes similar components and functionality to systems 100A and 100B, the difference being that system 100C includes both a waveform generator 106 and a spectrum analyzer 108 on the radio frequency antenna 114 side and that the digital host 102 includes a digital loopback. The waveform generator 106 is communicatively coupled to the radio frequency antenna 114 of the antenna unit 104 by the communication medium 116. In addition, the radio frequency antenna 114 of the antenna unit 104 of the distributed antenna system under test 101 is communicatively coupled to the spectrum analyzer 108 by a communication medium 126. The waveform generator 106 is also communicatively coupled directly to the spectrum analyzer 108 through communication medium 118 without going through the distributed antenna system under test 101.

The antenna unit 104 receives radio frequency (RF) signals from the waveform generator 106, converts them to digital signals, and communicates the digital signals to the digital host 102. The digital host 102 receives digital signals from the antenna unit 104 and loops them back to the antenna unit 104. The antenna unit 104 receives the loopedback digital signals from digital host 102, converts them to radio frequency (RF) signals and transmits the RF signals to the spectrum analyzer 108. The spectrum analyzer 108 receives and analyzes the RF signals received from the antenna unit 104 via the radio frequency antenna 114. The waveform generator 106 generates a Gaussian pulse and applies that to the radio frequency antenna 114 of the antenna unit 104. The waveform generator 106 marks the Gaussian pulse with respect to a frame of digital data with a marker. The antenna unit 104 converts the Gaussian pulse to a digital representation and propagates the digital representation of the Gaussian pulse to the digital host 102 across the communication medium 112. The digital host 102 loops-back the digital representation of the Gaussian pulse to the antenna unit 104. The antenna unit 104 converts the looped-back digital representation of the Gaussian pulse back to an looked-back analog representation of the Gaussian pulse and communicates it to the spectrum analyzer 108 via the radio frequency antenna 114. The spectrum analyzer 108 measures when the Gaussian pulse occurs in the looped-back analog representation of the Gaussian pulse based on the marker. In exemplary embodiments, the Gaussian Pulse is used because the shape of the waveform is maintained (particularly the peak), even with multiple stages of filtering (digital and RF), allowing for an accurate delay measurement. In exemplary embodiments, the Gaussian Pulse provides minimal distortion in bandwidth limited radio frequency (RF) channels.

The system 100C is configured to determine a round-trip loopback propagation delay for the distributed antenna system under test 101 between application of the Gaussian pulse at the radio frequency antenna 114 of the antenna unit 104 and output of the looped-back analog representation of the Gaussian pulse at the radio frequency antenna 114 of the antenna unit 104. In exemplary embodiments, the round-trip loopback propagation delay includes both intrinsic delay of the digital host 102 and antenna unit 104 and transmission delay across the communication medium 112. In exemplary embodiments, the system 100B is configured to determine the uplink transmission delay across the communication medium 112 between the digital host 102 and the antenna unit 104. In exemplary embodiments, the system 100B is configured to determine both the round-trip loopback propagation delay and the downlink delay. In some implementations, the downlink delay is calculated using the system 100A described above. In exemplary embodiments, the system 100B is further configured to subtract the downlink delay and the uplink transmission delay across the communication medium 112 from the round trip propagation delay to determine a total uplink intrinsic delay including first intrinsic delay of the digital host 102 and second intrinsic delay of the antenna unit 104.

In exemplary embodiments, the waveform generator 106 is configured to provide the marker to the spectrum analyzer 108 via communication medium 118 separate from and bypassing the distributed antenna system under test 101. In exemplary embodiments, the digital host 102 is configured to output digital signals selected from one of a Common Public Radio Interface (CPRI) external device interface, an Open Base Station Architecture Initiative (OBSAI) external device interface, and an Open Radio Interface (ORI) external device interface.

In exemplary embodiments, the communication medium 112 is an optical fiber and the communication across the communication medium 112 is optical. In these embodiments, an electrical to optical conversion occurs at the digital host 102 and antenna unit 104. In other embodiments, the communication medium 112 is a conductive cable (such as coaxial cable, twisted pair, etc.) and the communication across the communication medium 112 is electrical. In exemplary embodiments, the communication across the communication medium 112 is digital. In exemplary embodiments, the communication across the communication medium 112 is analog. In exemplary embodiments, any mixture of optical, electrical, analog, and digital communication occurs across the communication medium 110. In exemplary embodiments, the antenna unit 104 includes functionality to convert between digital and analog signals.

Figure 1D:
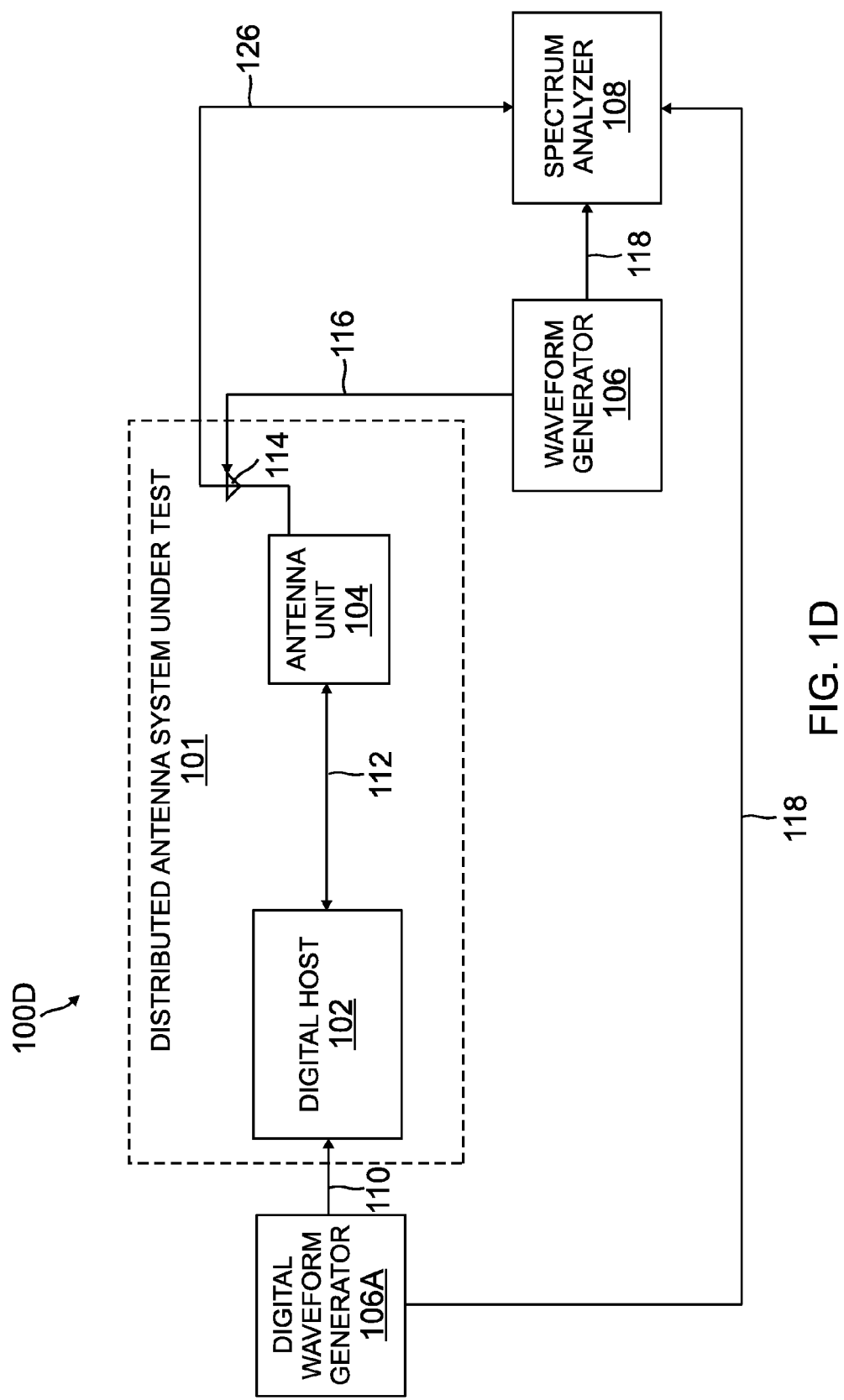

FIG. 1D is a block diagram of an exemplary embodiment of a system 100D for measuring delays in a distributed antenna system under test 101. Distributed antenna system under test 101 includes a digital host 102 and an antenna unit 104. System 100D includes a waveform generator 106 and a spectrum analyzer 108. The digital host 102 of the distributed antenna system under test 101 is communicatively coupled to the antenna unit 104 by a communication medium 112. In exemplary embodiments, the communication medium 112 is at least one of an optical fiber, coaxial cable, and twisted pair. The antenna unit 104 includes a radio frequency antenna 114.

System 100D includes similar components and functionality to systems 100A, 100B, and 100C, the difference being that system 100D includes both a waveform generator 106 and a spectrum analyzer 108 on the radio frequency antenna 114 side and a digital waveform generator 106A on the digital host 102 side and that the digital host 102 includes a digital loopback. Accordingly, the system 100D is configured to determine the round trip delay in the same way as system 100C described above and also the downlink delay in the same way as system 100B described above. In exemplary embodiments, the uplink delay is then calculated by subtracting the downlink delay (and the transport delay across communication medium 112) from the round trip delay.

Figure 2:
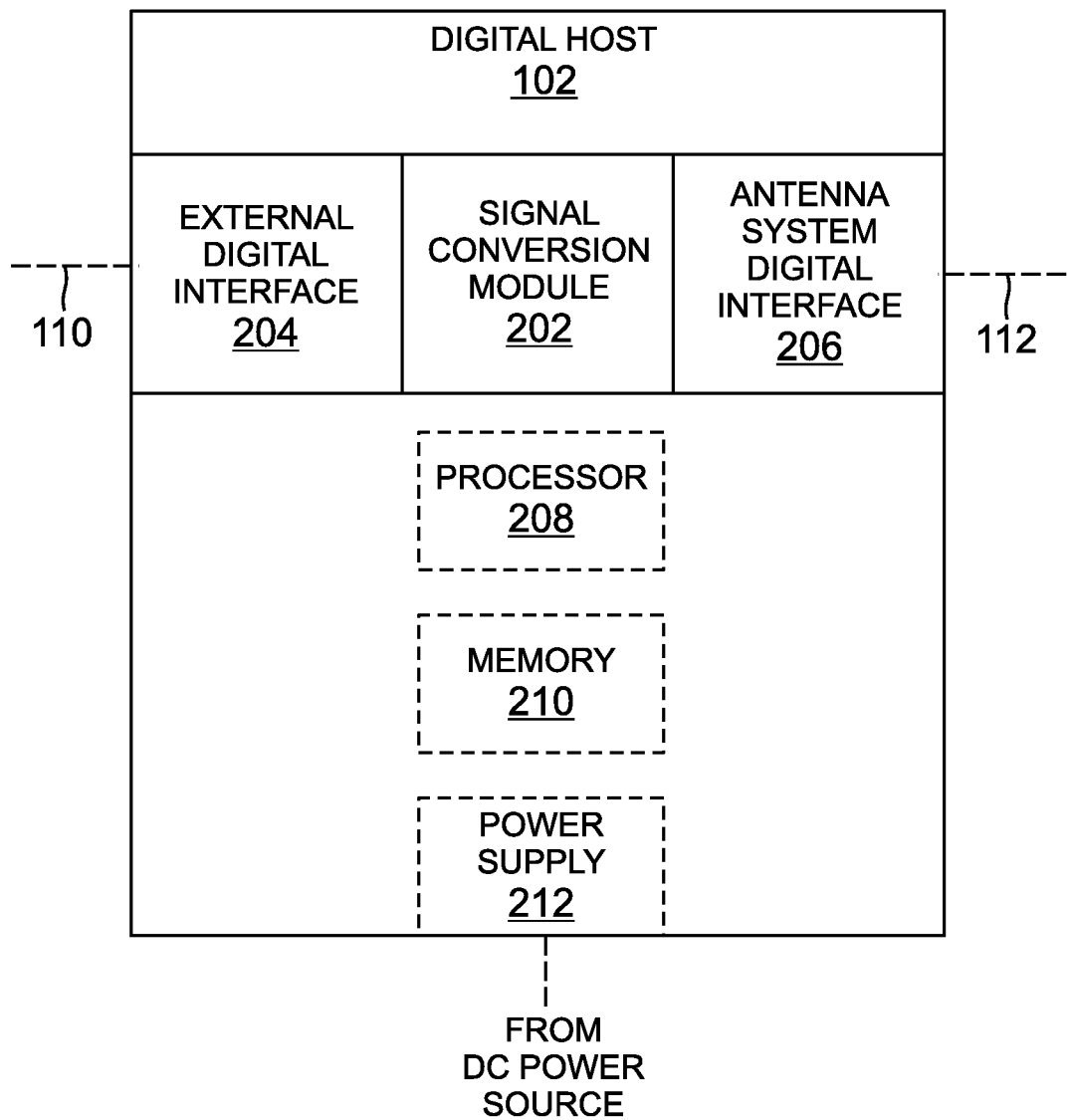
FIG. 2 is a block diagram of exemplary embodiments of a host unit used in distributed antenna systems, such as the exemplary distributed antenna system in FIGS. 1A-1D.

FIG. 2 is a block diagram of an exemplary embodiment of digital host 102. Digital host 102 includes a signal conversion module 202, an external digital interface 204, an antenna system digital interface 206, an optional processor 208, an optional memory 210, and an optional power supply 212. In exemplary embodiments, signal conversion module 202 is communicatively coupled to either a waveform generator 106 or a spectrum analyzer 108 through the external digital interface 204. Signal conversion module 202 is also communicatively coupled to at least one communication medium 112 by antenna system digital interface 206. In exemplary embodiments, the communication medium 112 is an optical communication link across a fiber optic cable, though it can also be other types of wired or wireless links in other embodiments. In exemplary embodiments, the signal conversion module 202 and/or portions of the external digital interface 204 and/or the antenna system digital interface 206 are implemented using optional processor 208 and optional memory 210. In exemplary embodiments, the optional power supply 212 provides power to the various elements of the digital host 102.

When measuring the downlink delay, the external digital interface 204 is configured to receive the digital representation of the Gaussian pulse from a waveform generator 106. The signal conversion module 202 is configured to convert the received Gaussian pulse to a downlink radio system signal. In exemplary embodiments, the signal conversion module 202 and/or the antenna system digital interface 206 converts the radio system signal from electrical signals to optical signals for output on communication medium 112. In other embodiments, the radio system signal is transported using a conductive communication medium, such as coaxial cable or twisted pair, and the optical conversion is not necessary. The antenna system digital interface 206 is configured to communicate the downlink radio system signal on communication medium 112.

When measuring the uplink delay, antenna system digital interface 206 is configured to receive an uplink digital representation of a Gaussian pulse from communication medium 112. In exemplary embodiments where communication medium 112 is an optical medium, the antenna system digital interface 206 and/or the signal conversion module 202 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 202 is further configured to convert the uplink radio system signal to uplink signals. External digital interface 204 is configured to communicate the uplink digital representation of the Gaussian pulse to a spectrum analyzer 108.

When measuring the round trip delay, the external digital interface 204 is configured as a loop back. In exemplary embodiments, the antenna system digital interface 206 is configured to receive an uplink digital representation of a Gaussian pulse from communication medium 112. In exemplary embodiments where communication medium 112 is an optical medium, the antenna system digital interface 206 and/or the signal conversion module 202 is configured to convert the uplink radio system signal between received optical signals and electrical signals. In other embodiments, the radio system signal is transported using a conductive communication medium, such as coaxial cable or twisted pair, and the optical conversion is not necessary. The signal conversion module 202 is further configured to convert the uplink radio system signal to uplink signals. External digital interface 204 is configured to loop back the uplink digital representation of the Gaussian pulse into the downlink back to the signal conversion module 202. In exemplary embodiments, the signal conversion module 202 is configured to convert the received Gaussian pulse to a downlink radio system signal. In exemplary embodiments, the signal conversion module 202 and/or the antenna system digital interface 206 converts the radio system signal from electrical signals to optical signals for output on communication medium 112. In other embodiments, the radio system signal is transported using a conductive medium, such as coaxial cable or twisted pair, and the optical conversion is not necessary. The antenna system digital interface 206 is configured to communicate the downlink radio system signal on communication medium 112.

Figure 3:
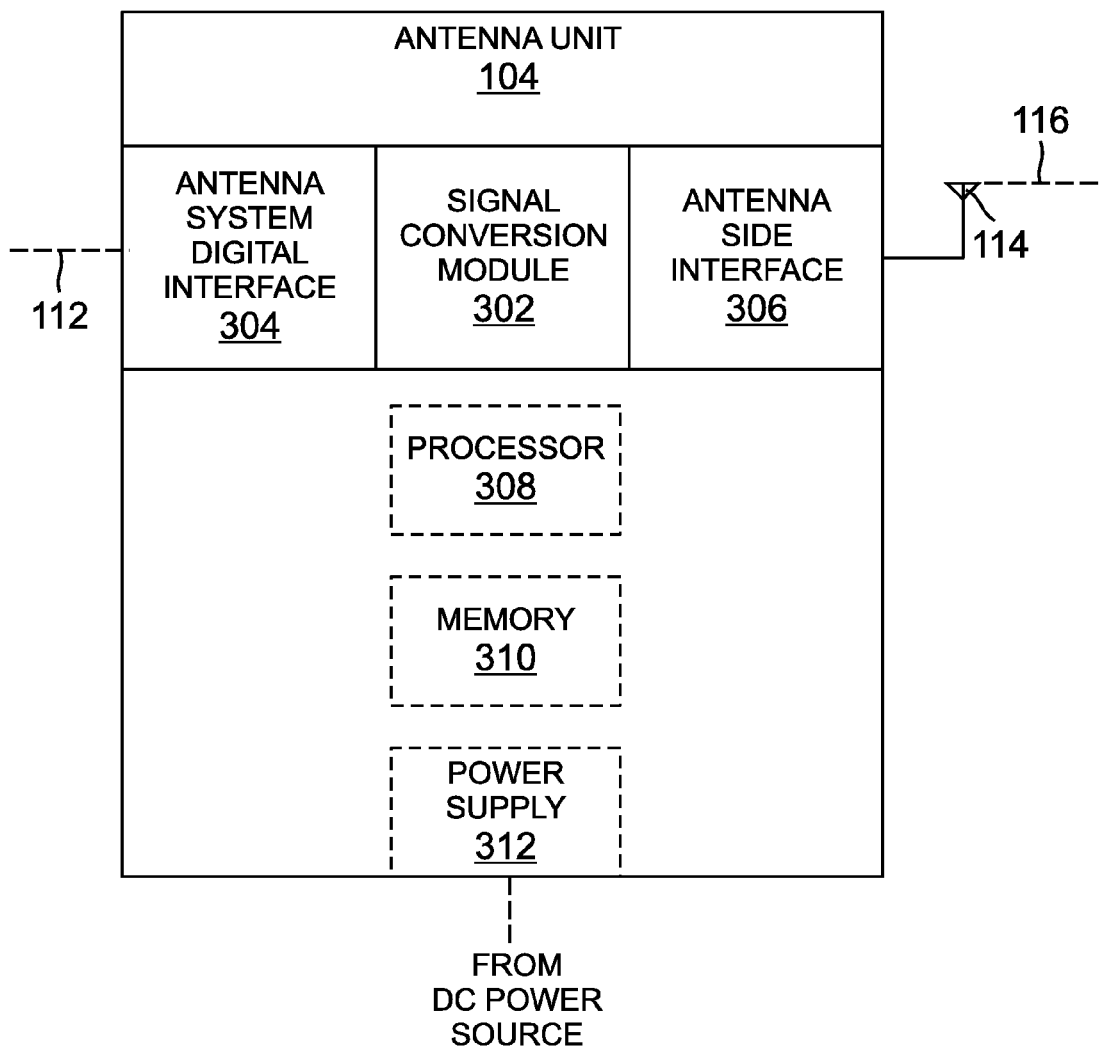
FIG. 3 is a block diagram of an exemplary embodiment of an antenna unit used in distributed antenna systems, such as the exemplary distributed antenna system in FIGS. 1A-1D.

FIG. 3 is a block diagram of an exemplary embodiment of an antenna unit 104. The antenna unit 104 includes a signal conversion module 302, an antenna system digital interface 304, an antenna side interface 306, an optional processor 308, optional memory 310, and optional power supply 312. In exemplary embodiments, signal conversion module 302, antenna system digital interface 304, and/or the antenna side interface 306 are implemented at least in part by optional processor 308 and optional memory 310. In exemplary embodiments, optional power supply 312 is used to power the various components of the antenna unit 104.

When measuring downlink delay and round trip delay, the antenna system digital interface 304 is configured to receive a digital representation of the Gaussian pulse from the digital host 102 across communication medium 112. The signal conversion module 302 is configured to convert the received Gaussian pulse to a downlink radio frequency signal including the Gaussian pulse. The antenna side interface 306 is configured to communicate the downlink frequency signal having the Gaussian pulse using the radio frequency antenna 114 to a spectrum analyzer 108.

When measuring uplink delay and round trip delay, antenna side interface 306 is configured to receive an uplink radio frequency signal having a Gaussian pulse from a waveform generator 106. The signal conversion module 302 is configured to convert the received Gaussian pulse to an uplink digital representation of the Gaussian pulse in a digital signal communicated to the digital host across the communication medium 112 via antenna system digital interface 304.

In exemplary embodiments where communication medium 112 is an optical medium, the antenna system digital interface 304 and/or the signal conversion module 302 is configured to convert the uplink radio system signal between received electrical signals and optical signals. In other embodiments, the radio system signal is transported using a conductive communication medium, such as coaxial cable or twisted pair, and the optical conversion is not necessary.

Figure 4:
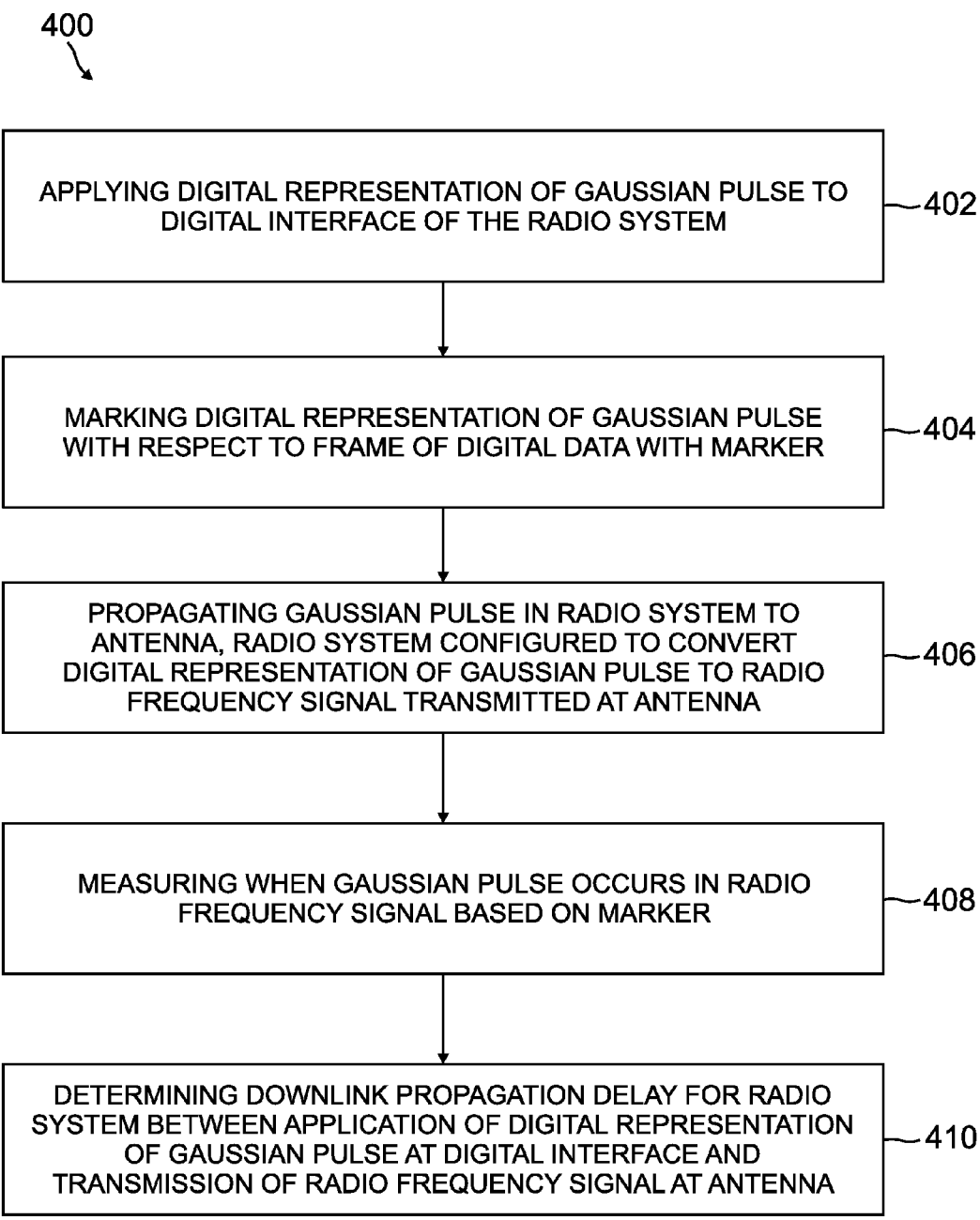
FIG. 4 is a flow diagram illustrating an exemplary embodiment of a method for measuring downlink delay in a distributed antenna system.

FIG. 4 is a flow diagram illustrating one exemplary embodiment of a method 400 for measuring downlink delay in a radio system. Exemplary method 400 begins at block 402 with applying a digital representation of a Gaussian pulse to a digital interface of the radio system. Exemplary method 400 proceeds to block 404 with marking the digital representation of the Gaussian pulse with respect to a frame of digital data with a marker. Exemplary method 400 proceeds to block 406 with propagating the Gaussian pulse in the radio system to an antenna. The radio system is configured to convert the digital representation of the Gaussian pulse to a radio frequency signal transmitted at the antenna. Exemplary method 400 proceeds to block 408 with measuring when the Gaussian pulse occurs in the radio frequency signal based on the marker. Exemplary method 400 proceeds to block 410 with determining a downlink propagation delay for the radio system between application of the digital representation of the Gaussian pulse at the digital interface and transmission of the radio frequency signal at the antenna. In exemplary embodiments, the downlink propagation delay includes intrinsic delay and downlink transmission delay across a communication medium between two components of the radio system. In exemplary embodiments, the downlink propagation delay includes a first intrinsic delay within the digital interface to the radio system, a second intrinsic delay within an antenna unit communicatively coupled to the antenna and remotely coupled with the digital interface across a communication medium, and wherein the downlink propagation delay further includes a downlink transmission delay across the communication medium between the digital interface and the antenna unit.

In exemplary embodiments, method 400 further includes measuring the downlink transmission delay across the communication medium between the digital interface and the antenna unit and subtracting the downlink transmission delay from the downlink propagation delay to determine a total intrinsic delay including the first intrinsic delay and the second intrinsic delay. In exemplary embodiments, method 400 further includes generating the Gaussian pulse. In exemplary embodiments, method 400 further includes converting the Gaussian pulse to a digital representation of the Gaussian pulse. In exemplary embodiments, measuring when the Gaussian pulse occurs in the radio frequency signal based on the marker occurs using a spectrum analyzer. In exemplary embodiments, method 400 includes providing the marker from a first device used to generate the digital representation of the Gaussian pulse to a second device used to analyze the radio frequency signal to determine when the Gaussian pulse occurs. In exemplary embodiments, propagating the Gaussian pulse in the radio system to the antenna occurs across an optical fiber. In exemplary embodiments, the digital interface is part of a host unit, the antenna is part of an antenna unit remote to the host unit, and the host unit and the antenna unit are communicatively coupled via a wired communication medium. In exemplary embodiments, the wired communication medium is at least one of an optical fiber, coaxial cable, and twisted pair.

Figure 5:
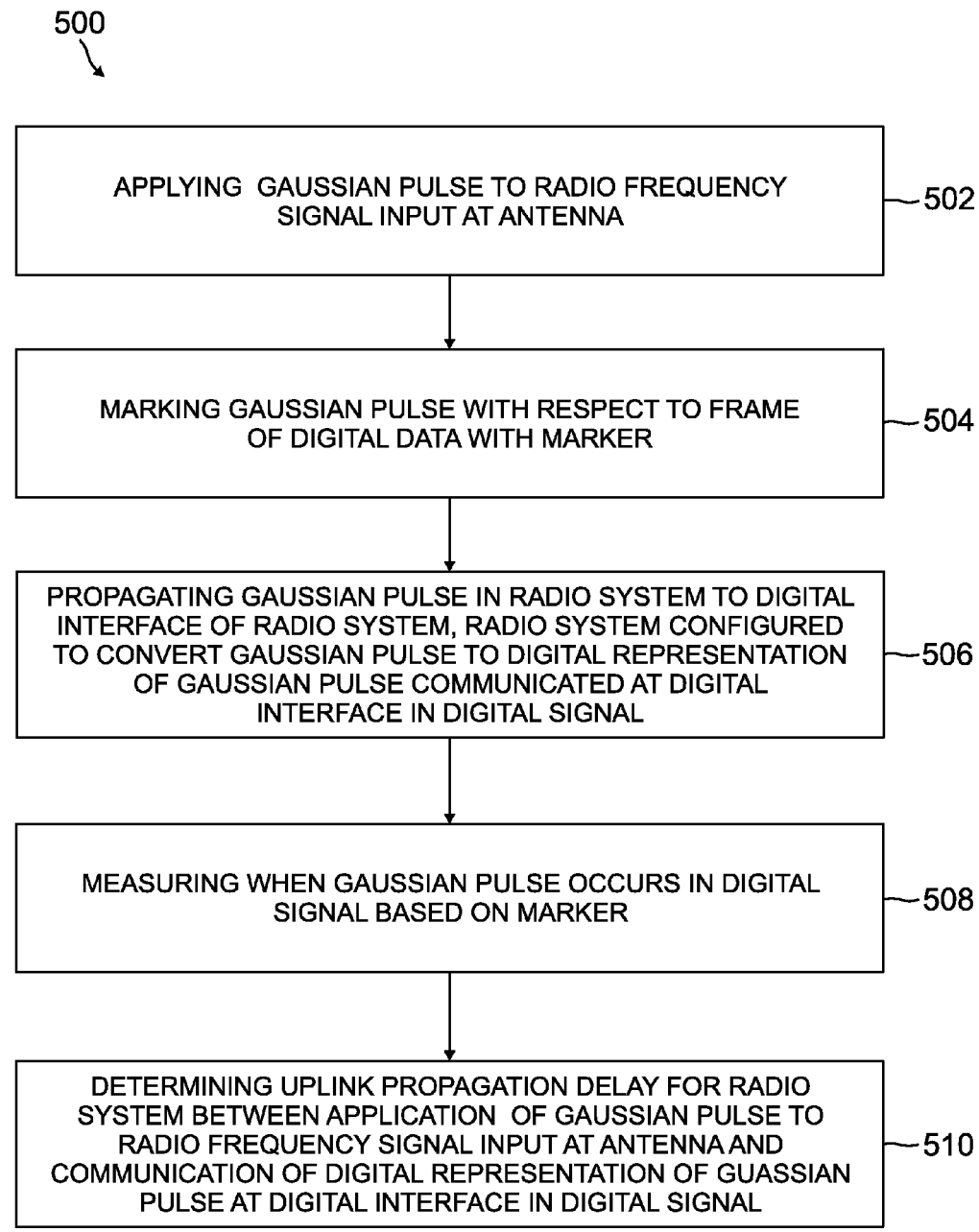
FIG. 5 is a flow diagram illustrating an exemplary embodiment of a method for measuring uplink delay in a distributed antenna system.

FIG. 5 is a flow diagram illustrating one exemplary embodiment of a method 500 for measuring uplink delay in a radio system. Exemplary method 500 begins at block 502 with applying a Gaussian pulse to a radio frequency signal input at an antenna. Exemplary method 500 proceeds to block 504 with marking the Gaussian pulse with respect to a frame of digital data with a marker. Exemplary method 500 proceeds to block 506 with propagating the Gaussian pulse in the radio system to a digital interface of the radio system, the radio system configured to convert the Gaussian pulse to a digital representation of the Gaussian pulse communicated at the digital interface in a digital signal. Exemplary method 500 proceeds to block 508 with measuring when the Gaussian pulse occurs in the digital signal based on the marker. Exemplary method 500 proceeds to block 510 with determining an uplink propagation delay for the radio system between application of the Gaussian pulse to the radio frequency signal input at the antenna and communication of the digital representation of the Gaussian pulse at the digital interface in the digital signal.

In exemplary embodiments, the uplink propagation delay includes intrinsic delay and uplink transmission delay across a communication medium between two components of the radio system. In exemplary embodiments, the uplink propagation delay includes a first uplink intrinsic delay within an antenna unit communicatively coupled to the antenna and remotely coupled with the digital interface across a communication medium. In exemplary embodiments, the uplink propagation delay further includes a second uplink intrinsic delay within the digital interface to the radio system. In exemplary embodiments, the downlink propagation delay further includes an uplink transmission delay across the communication medium between the antenna unit and the digital interface.

In exemplary embodiments, method 500 further includes measuring the uplink transmission delay across the communication medium between the antenna unit and the digital interface and subtracting the uplink transmission delay from the uplink propagation delay to determine a total uplink intrinsic delay including the first uplink intrinsic delay and the second uplink intrinsic delay. In exemplary embodiments, method 500 further includes generating the Gaussian pulse. In exemplary embodiments, method 500 further includes converting the digital representation of the Gaussian pulse back to the Gaussian pulse. In exemplary embodiments, measuring when the Gaussian pulse occurs in the digital signal based on the marker occurs using a spectrum analyzer.

In exemplary embodiments, method 500 further includes providing the marker from a first device used to generate the Gaussian pulse to a second device used to analyze the digital signal to determine when the Gaussian pulse occurs. In exemplary embodiments, propagating the Gaussian pulse in the radio system to the digital interface occurs across an optical fiber. In exemplary embodiments, the digital interface is part of a host unit, the antenna is part of an antenna unit remote to the host unit, and the host unit and the antenna unit are communicatively coupled via a wired communication medium. In exemplary embodiments, the wired communication medium is at least one of an optical fiber, coaxial cable, and twisted pair.

Figure 6A:
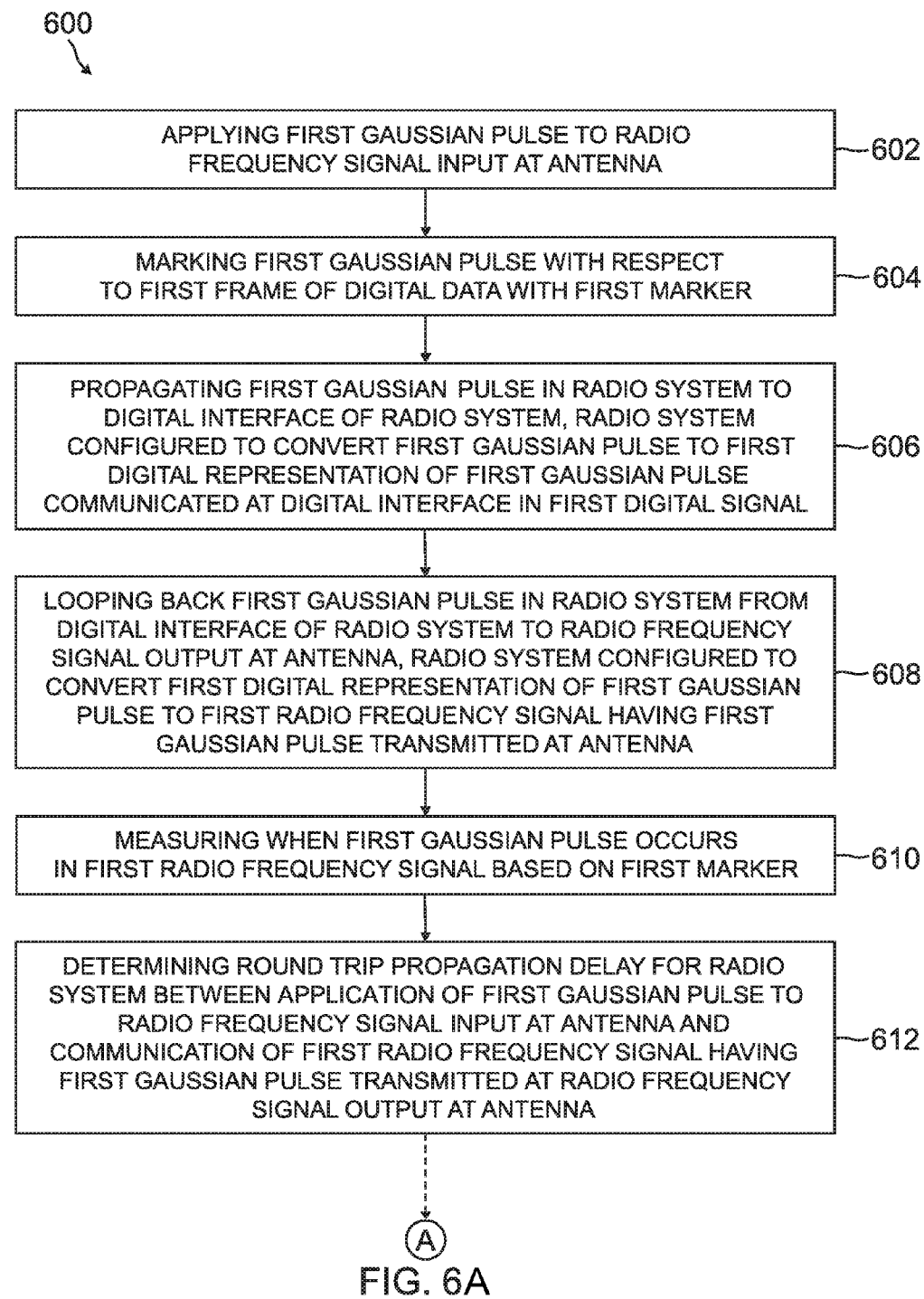
FIGS. 6A-6B show a flow diagram illustrating an exemplary embodiment of a method for measuring delay in a distributed antenna system.
Figure 6B:
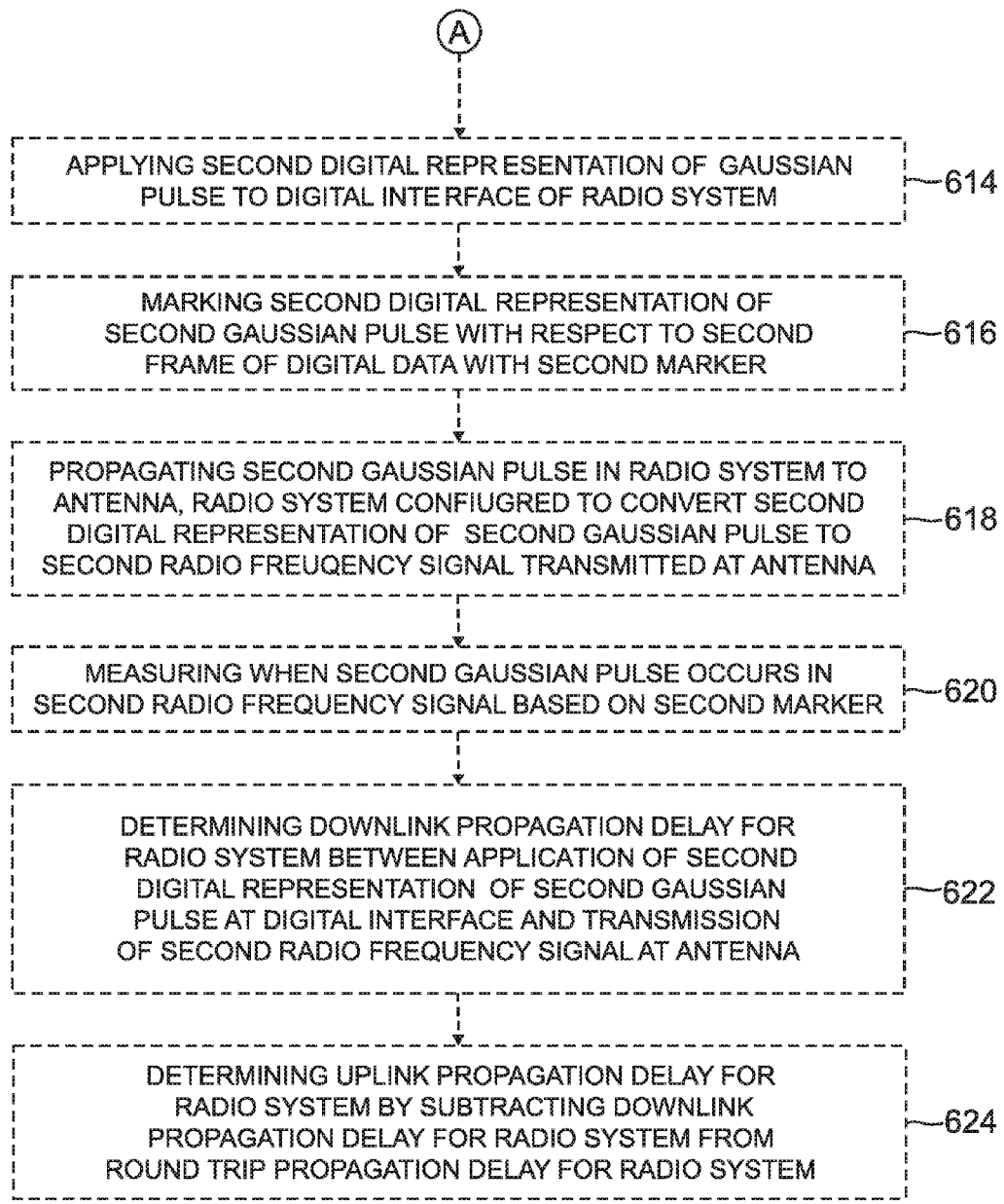

FIGS. 6A-6B show a flow diagram illustrating one exemplary embodiment of a method 600 for measuring delay in a radio system. Exemplary method 600 begins at block 602 with applying a first Gaussian pulse to a radio frequency signal input at an antenna. Exemplary method 600 proceeds to block 604 with marking the first Gaussian pulse with respect to a first frame of digital data with a first marker. Exemplary method 600 proceeds to block 606 with propagating the first Gaussian pulse in a radio system to a digital interface of the radio system, the radio system configured to convert the first Gaussian pulse to a first digital representation of the first Gaussian pulse communicated at the digital interface in a first digital signal.

Exemplary method 600 proceeds to block 608 with looping back the first Gaussian pulse in the radio system from the digital interface of the radio system to a radio frequency signal output at the antenna, the radio system configured to convert the first digital representation of the first Gaussian pulse to a first radio frequency signal having the first Gaussian pulse transmitted at the antenna. Exemplary method 600 proceeds to block 610 with measuring when the first Gaussian pulse occurs in the first radio frequency signal based on the first marker. Exemplary method 600 proceeds to block 612 with determining a round trip propagation delay for the radio system between application of the first Gaussian pulse to the radio frequency signal input at the antenna and communication of the first radio frequency signal having the first Gaussian pulse transmitted at the radio frequency signal output at the antenna.

Exemplary method 600 proceeds to optional block 614 with applying a second digital representation of a second Gaussian pulse to the digital interface of the radio system. Exemplary method 600 proceeds to optional block 616 with marking the second digital representation of the second Gaussian pulse with respect to a second frame of digital data with a second marker. Exemplary method 600 proceeds to optional block 618 with propagating the second Gaussian pulse in the radio system to the antenna, the radio system configured to convert the second digital representation of the second Gaussian pulse to a second radio frequency signal transmitted at the antenna. Exemplary method 600 proceeds to optional block 620 with measuring when the second Gaussian pulse occurs in the second radio frequency signal based on the second marker.

Exemplary method 600 proceeds to optional block 622 with determining a downlink propagation delay for the radio system between application of the second digital representation of the second Gaussian pulse at the digital interface and transmission of the second radio frequency signal at the antenna. Exemplary method 600 proceeds to optional block 624 with determining an uplink propagation delay for the radio system by subtracting the downlink propagation delay for the radio system from the round trip propagation delay for the radio system.

Any of the processors described above may include or function with software programs, firmware or other computer readable instructions for carrying out various methods, process tasks, calculations, and control functions, described herein. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a method for measuring downlink delay in a radio system, comprising: applying a digital representation of a Gaussian pulse to a digital interface of the radio system; marking the digital representation of the Gaussian pulse with respect to a frame of digital data with a marker; propagating the Gaussian pulse in the radio system to an antenna, the radio system configured to convert the digital representation of the Gaussian pulse to a radio frequency signal transmitted at the antenna; measuring when the Gaussian pulse occurs in the radio frequency signal based on the marker; and determining a downlink propagation delay for the radio system between application of the digital representation of the Gaussian pulse at the digital interface and transmission of the radio frequency signal at the antenna.

Example 2 includes the method of Example 1, wherein the downlink propagation delay includes intrinsic delay and transmission delay across a communication medium between two components of the radio system.

Example 3 includes the method of any of Examples 1-2, wherein the downlink propagation delay includes a first intrinsic delay within the digital interface to the radio system; wherein the downlink propagation delay includes a second intrinsic delay within an antenna unit communicatively coupled to the antenna and remotely coupled with the digital interface across a communication medium; and wherein the downlink propagation delay further includes a transmission delay across the communication medium between the digital interface and the antenna unit.

Example 4 includes the method of Example 3, further comprising: measuring the transmission delay across the communication medium between the digital interface and the antenna unit; and subtracting the transmission delay from the downlink propagation delay to determine a total intrinsic delay including the first intrinsic delay and the second intrinsic delay.

Example 5 includes the method of any of Examples 1-4, further comprising: generating the Gaussian pulse.

Example 6 includes the method of any of Examples 1-5, further comprising: converting the Gaussian pulse to a digital representation of the Gaussian pulse.

Example 7 includes the method of any of Examples 1-6, wherein measuring when the Gaussian pulse occurs in the radio frequency signal based on the marker occurs using a spectrum analyzer.

Example 8 includes the method of any of Examples 1-7, further comprising providing the marker from a first device used to generate the digital representation of the Gaussian pulse to a second device used to analyze the radio frequency signal to determine when the Gaussian pulse occurs.

Example 9 includes the method of any of Examples 1-8, wherein propagating the Gaussian pulse in the radio system to the antenna occurs across an optical fiber.

Example 10 includes the method of any of Examples 1-9, wherein the digital interface is part of a host unit; wherein the antenna is part of an antenna unit remote to the host unit; and wherein the host unit and the antenna unit are communicatively coupled via a wired communication medium.

Example 11 includes the method of Example 10, wherein the wired communication medium is at least one of an optical fiber, coaxial cable, and twisted pair.

Example 12 includes a system for measuring downlink delay in a radio system, comprising: a waveform generator configured to generate a digital representation of a Gaussian pulse and apply it to a digital interface of the radio system; wherein the waveform generator is further configured to mark the digital representation of the Gaussian pulse with respect to a frame of digital data with a marker; wherein the radio system is configured to propagate the Gaussian pulse and convert the digital representation of the Gaussian pulse to a radio frequency signal transmitted at an antenna; a spectrum analyzer configured to measure when the Gaussian pulse occurs in the radio frequency signal based on the marker; and wherein the system is configured to determine a downlink propagation delay for the radio system between application of the digital representation of the Gaussian pulse at the digital interface and transmission of the radio frequency signal at the antenna.

Example 13 includes the system of Example 12, wherein the downlink propagation delay includes intrinsic delay and transmission delay across a communication medium between two components of the radio system.

Example 14 includes the system of any of Examples 12-13, wherein the downlink propagation delay includes a first intrinsic delay within the digital interface to the radio system; wherein the downlink propagation delay includes a second intrinsic delay within an antenna unit communicatively coupled to the antenna and remotely coupled with the digital interface across a communication medium; and wherein the downlink propagation delay further includes a transmission delay across the communication medium between the digital interface and the antenna unit.

Example 15 includes the system of Example 14, further comprising: wherein the system is further configured to determine the transmission delay across the communication medium between the digital interface and the antenna unit; and wherein the system is further configured to subtract the transmission delay from the downlink propagation delay to determine a total intrinsic delay including the first intrinsic delay and the second intrinsic delay.

Example 16 includes the system of any of Examples 12-15, wherein the waveform generator is configured to provide the marker to the spectrum analyzer via a communication medium separate from the radio system.

Example 17 includes the system of any of Examples 12-16, wherein the radio system includes a digital host having the digital interface; wherein the radio system includes an antenna unit having the antenna; wherein the digital host is communicatively coupled to the antenna unit via a communication medium.

Example 18 includes the system of Example 17, wherein the digital host is configured to communicate the Gaussian pulse to the antenna unit via the communication medium; and wherein the antenna unit is configured to convert the digital representation of the Gaussian pulse to a radio frequency signal transmitted at the antenna.

Example 19 includes the system of any of Examples 17-18, wherein the communication medium is at least one of an optical fiber, coaxial cable, and twisted pair.

Example 20 includes a method for measuring uplink delay in a radio system, comprising: applying a Gaussian pulse to a radio frequency signal input at an antenna; marking the Gaussian pulse with respect to a frame of digital data with a marker; propagating the Gaussian pulse in the radio system to a digital interface of the radio system, the radio system configured to convert the Gaussian pulse to a digital representation of the Gaussian pulse communicated at the digital interface in a digital signal; measuring when the Gaussian pulse occurs in the digital signal based on the marker; and determining an uplink propagation delay for the radio system between application of the Gaussian pulse to the radio frequency signal input at the antenna and communication of the digital representation of the Gaussian pulse at the digital interface in the digital signal.

Example 21 includes the method of Example 20, wherein the uplink propagation delay includes intrinsic delay and transmission delay across a communication medium between two components of the radio system.

Example 22 includes the method of any of Examples 20-21, wherein the uplink propagation delay includes a first intrinsic delay within an antenna unit communicatively coupled to the antenna and remotely coupled with the digital interface across a communication medium; wherein the uplink propagation delay further includes a second intrinsic delay
within the digital interface to the radio system; and wherein the uplink propagation delay further includes a transmission delay across the communication medium between the antenna unit and the digital interface.

Example 23 includes the method of Example 22, further comprising: measuring the digital transmission delay across the communication medium between the antenna unit and the digital interface; and subtracting the digital transmission delay from the uplink propagation delay to determine a total intrinsic delay including the first intrinsic delay and the second intrinsic delay.

Example 24 includes the method of any of Examples 20-23, further comprising: generating the Gaussian pulse.

Example 25 includes the method of any of Examples 20-24, further comprising: converting the digital representation of the Gaussian pulse back to the Gaussian pulse.

Example 26 includes the method of any of Examples 20-25, wherein measuring when the Gaussian pulse occurs in the digital signal based on the marker occurs using a spectrum analyzer.

Example 27 includes the method of any of Examples 20-26, further comprising providing the marker from a first device used to generate the Gaussian pulse to a second device used to analyze the digital signal to determine when the Gaussian pulse occurs.

Example 28 includes the method of any of Examples 20-27, wherein propagating the Gaussian pulse in the radio system to the digital interface occurs across an optical fiber.

Example 29 includes the method of any of Examples 20-28, wherein the digital interface is part of a host unit; wherein the antenna is part of an antenna unit remote to the host unit; and wherein the host unit and the antenna unit are communicatively coupled via a wired communication medium.

Example 30 includes the method of any of Examples 20-29, wherein the wired communication medium is at least one of an optical fiber, coaxial cable, and twisted pair.

Example 31 includes a system for measuring uplink delay in a radio system, comprising: a waveform generator configured to generate a Gaussian pulse and apply it to an antenna of the radio system; wherein the waveform generator is further configured to mark the Gaussian pulse with respect to a frame of digital data with a marker; wherein the radio system is configured to propagate the Gaussian pulse and convert the Gaussian pulse to a digital representation of the Gaussian pulse output at a digital interface of the radio system; a spectrum analyzer configured to measure when the digital representation of the Gaussian pulse occurs in a digital signal output from the digital interface of the radio system; and wherein the system is configured to determine an uplink propagation delay for the radio system between application of the Gaussian pulse at the antenna of the radio system and output of the digital signal at the digital interface of the radio system.

Example 32 includes the system of Example 31, wherein the uplink propagation delay includes intrinsic delay and transmission delay across a communication medium between two components of the radio system.

Example 33 includes the system of any of Examples 31-32, wherein the uplink propagation delay includes a first intrinsic delay within the digital interface to the radio system; wherein the uplink propagation delay includes a second intrinsic delay within an antenna unit communicatively coupled to the antenna and remotely coupled with the digital interface across a communication medium; and wherein the uplink propagation delay further includes a transmission delay across the communication medium between the digital interface and the antenna unit.

Example 34 includes the system of Example 33, further comprising: wherein the system is further configured to determine the uplink transmission delay across the communication medium between the digital interface and the antenna unit; and wherein the system is further configured to subtract the uplink transmission delay from the uplink propagation delay to determine a total intrinsic delay including the first intrinsic delay and the second intrinsic delay.

Example 35 includes the system of any of Examples 31-34, wherein the waveform generator is configured to provide the marker to the spectrum analyzer via a communication medium separate from the radio system.

Example 36 includes the system of any of Examples 31-35, wherein the radio system includes a digital host having the digital interface; wherein the radio system includes an antenna unit having the antenna; wherein the digital host is communicatively coupled to the antenna unit via a communication medium.

Example 37 includes the system of Example 36, wherein the antenna unit is configured to communicate the digital Gaussian pulse to the digital host via the communication medium; and wherein the antenna unit is configured to convert a radio frequency signal received at the antenna and including the Gaussian pulse to a digital representation of the Gaussian pulse output at the digital interface.

Example 38 includes the system of any of Examples 36-37, wherein the communication medium is at least one of an optical fiber, coaxial cable, and twisted pair.

Example 39 includes a method for measuring delay in a radio system, comprising: applying a first Gaussian pulse to a radio frequency signal input at an antenna; marking the first Gaussian pulse with respect to a first frame of digital data with a first marker; propagating the first Gaussian pulse in the radio system to a digital interface of the radio system, the radio system configured to convert the first Gaussian pulse to a first digital representation of the first Gaussian pulse communicated at the digital interface in a first digital signal; looping back the first Gaussian pulse in the radio system from the digital interface of the radio system to a radio frequency signal output at the antenna, the radio system configured to convert the first digital representation of the first Gaussian pulse to a first radio frequency signal having the first Gaussian pulse transmitted at the antenna; measuring when the first Gaussian pulse occurs in the first radio frequency signal based on the first marker; and determining a round trip propagation delay for the radio system between application of the first Gaussian pulse to the radio frequency signal input at the antenna and communication of the first radio frequency signal having the first Gaussian pulse transmitted at the radio frequency signal output at the antenna.

Example 40 includes the method of Example 39, further comprising: applying a second digital representation of a second Gaussian pulse to the digital interface of the radio system; marking the second digital representation of the second Gaussian pulse with respect to a second frame of digital data with a second marker; propagating the second Gaussian pulse in the radio system to the antenna, the radio system configured to convert the second digital representation of the second Gaussian pulse to a second radio frequency signal transmitted at the antenna; measuring when the second Gaussian pulse occurs in the second radio frequency signal based on the second marker; and determining a downlink propagation delay for the radio system between application of the second digital representation of the second Gaussian pulse at the digital interface and transmission of the second radio frequency signal at the antenna.

Example 41 includes the method of Example 40, further comprising: determining an uplink propagation delay for the radio system by subtracting the downlink propagation delay for the radio system from the round trip propagation delay for the radio system.

Example 42 includes the method of Example 41, wherein the uplink propagation delay includes intrinsic delay and transmission delay across a communication medium between two components of the radio system.

Example 43 includes the method of any of Examples 41-42, wherein the uplink propagation delay includes a first uplink intrinsic delay within an antenna unit communicatively coupled to the antenna and remotely coupled with the digital interface across a communication medium; wherein the uplink propagation delay further includes a second uplink intrinsic delay within the digital interface to the radio system; and wherein the uplink propagation delay further includes a transmission delay across the communication medium between the antenna unit and the digital interface.

Example 44 includes the method of Example 43, further comprising: measuring the digital transmission delay across the communication medium between the antenna unit and the digital interface; and subtracting the digital transmission delay from the uplink propagation delay to determine a total uplink intrinsic delay including the first uplink intrinsic delay and the second uplink intrinsic delay.

Example 45 includes the method of any of Examples 39-44, further comprising: generating the first Gaussian pulse.

Example 46 includes the method of any of Examples 39-45, wherein measuring when the Gaussian pulse occurs in the digital signal based on the marker occurs using a spectrum analyzer.

Example 47 includes the method of any of Examples 39-46, further comprising providing the first marker from a first device used to generate the first Gaussian pulse to a second device used to analyze the first radio frequency signal to determine when the first Gaussian pulse occurs.

Example 48 includes the method of any of Examples 39-47, wherein propagating the Gaussian pulse in the radio system to the digital interface occurs across an optical fiber.

Example 49 includes the method of any of Examples 39-48, wherein the digital interface is part of a host unit; wherein the antenna is part of an antenna unit remote to the host unit; and wherein the host unit and the antenna unit are communicatively coupled via a wired communication medium.

Example 50 includes the method of Example 49, wherein the wired communication medium is at least one of an optical fiber, coaxial cable, and twisted pair.

Example 51 includes a system for measuring delay in a radio system, comprising: a first waveform generator configured to generate a first Gaussian pulse and to apply the first Gaussian pulse to an antenna of the radio system; wherein the first waveform generator is further configured to mark the first Gaussian pulse with respect to a first frame of digital data with a first marker; wherein the radio system is configured to propagate the first Gaussian pulse and convert the first Gaussian pulse to a first digital representation of the first Gaussian pulse output at a digital interface of the radio system; wherein the radio system is further configured to loop back the first Gaussian pulse in the radio system from the digital interface of the radio system to a radio frequency signal output at the antenna and to convert the first digital representation of the first Gaussian pulse to a first radio frequency signal having the first Gaussian pulse transmitted at the antenna; a spectrum analyzer configured to measure when the first Gaussian pulse occurs in the first radio frequency signal output at the antenna based on the first marker; wherein the system is configured to determine a round trip propagation delay for the radio system between application of the first Gaussian pulse to the radio frequency signal input at the antenna and communication of the first radio frequency signal having the first Gaussian pulse transmitted at the radio frequency signal output at the antenna.

Example 52 includes the system of Example 51, further comprising: a second digital waveform generator configured to generate a second digital representation of a second Gaussian pulse and to apply the second digital representation of the second Gaussian pulse to the digital interface of the radio system; wherein the second waveform generator is further configured to mark the second digital representation of the second Gaussian pulse with respect to a second frame of digital data with a second marker; wherein the radio system is further configured to propagate the second Gaussian pulse in the radio system to the antenna, the radio system configured to convert the second digital representation of the second Gaussian pulse to a second radio frequency signal transmitted at the antenna; wherein the spectrum analyzer is configured to measure when the second Gaussian pulse occurs in the second radio frequency signal based on the second marker; and wherein the radio system is further configured to determine a downlink propagation delay for the radio system between application of the second digital representation of the second Gaussian pulse at the digital interface and transmission of the second radio frequency signal at the antenna.

Example 53 includes the system of Example 52, further comprising: wherein the radio system is further configured to determine an uplink propagation delay for the radio system by subtracting the downlink propagation delay for the radio system from the round trip propagation delay for the radio system.

Example 54 includes the system of Example 53, wherein the uplink propagation delay includes intrinsic delay and transmission delay across a communication medium between two components of the radio system.

Example 55 includes the system of any of Examples 53-54, wherein the uplink propagation delay includes a first uplink intrinsic delay within an antenna unit communicatively coupled to the antenna and remotely coupled with the digital interface across a communication medium; wherein the uplink propagation delay further includes a second uplink intrinsic delay within the digital interface to the radio system; and wherein the uplink propagation delay further includes a transmission delay across the communication medium between the antenna unit and the digital interface.

Example 56 includes the system of Example 55, further comprising: wherein the radio system is further configured to measure the digital uplink transmission delay across the communication medium between the antenna unit and the digital interface; and wherein the radio system is further configured to subtract the digital uplink transmission delay from the uplink propagation delay to determine a total uplink intrinsic delay including the first uplink intrinsic delay and the second uplink intrinsic delay.

Example 57 includes the system of any of Examples 51-56, wherein the first waveform generator is further configured to provide the first marker to the spectrum analyzer to determine when the first Gaussian pulse occurs.

Example 58 includes the system of any of Examples 51-57, wherein the digital interface is part of a host unit; wherein the antenna is part of an antenna unit remote to the host unit; and wherein the host unit and the antenna unit are communicatively coupled via a wired communication medium.

Example 59 includes the system of Example 58, wherein the wired communication medium is at least one of an optical fiber, coaxial cable, and twisted pair.

What is claimed is:

1. A method for measuring downlink delay in a radio system, comprising:
    applying a digital representation of a Gaussian pulse to a digital interface of the radio system;
    marking the digital representation of the Gaussian pulse with respect to a frame of digital data with a marker;
    propagating the Gaussian pulse in the radio system to an antenna, the radio system configured to convert the digital representation of the Gaussian pulse to a radio frequency signal transmitted at the antenna;
    measuring when the Gaussian pulse occurs in the radio frequency signal based on the marker; and
    determining a downlink propagation delay for the radio system between application of the digital representation of the Gaussian pulse at the digital interface and transmission of the radio frequency signal at the antenna.

2. The method of claim 1, wherein the downlink propagation delay includes intrinsic delay and transmission delay across a communication medium between two components of the radio system.

3. The method of claim 1, wherein the downlink propagation delay includes a first intrinsic delay within the digital interface to the radio system;
    wherein the downlink propagation delay includes a second intrinsic delay within an antenna unit communicatively coupled to the antenna and remotely coupled with the digital interface across a communication medium; and
    wherein the downlink propagation delay further includes a transmission delay across the communication medium between the digital interface and the antenna unit.

4. The method of claim 3, further comprising:
    measuring the transmission delay across the communication medium between the digital interface and the antenna unit; and
    subtracting the transmission delay from the downlink propagation delay to determine a total intrinsic delay including the first intrinsic delay and the second intrinsic delay.

5. The method of claim 1, further comprising:
    generating the Gaussian pulse.

6. The method of claim 1, further comprising:
    converting the Gaussian pulse to a digital representation of the Gaussian pulse.

7. The method of claim 1, wherein measuring when the Gaussian pulse occurs in the radio frequency signal based on the marker occurs using a spectrum analyzer.

8. The method of claim 1, further comprising providing the marker from a first device used to generate the digital representation of the Gaussian pulse to a second device used to analyze the radio frequency signal to determine when the Gaussian pulse occurs.

9. The method of claim 1, wherein propagating the Gaussian pulse in the radio system to the antenna occurs across an optical fiber.

10. The method of claim 1, wherein the digital interface is part of a host unit;
    wherein the antenna is part of an antenna unit remote to the host unit; and
    wherein the host unit and the antenna unit are communicatively coupled via a wired communication medium.

11. The method of claim 10, wherein the wired communication medium is at least one of an optical fiber, coaxial cable, and twisted pair.

12. A system for measuring downlink delay in a radio system, comprising:
    a waveform generator configured to generate a digital representation of a Gaussian pulse and apply it to a digital interface of the radio system;
    wherein the waveform generator is further configured to mark the digital representation of the Gaussian pulse with respect to a frame of digital data with a marker;
    wherein the radio system is configured to propagate the Gaussian pulse and convert the digital representation of the Gaussian pulse to a radio frequency signal transmitted at an antenna;
    a spectrum analyzer configured to measure when the Gaussian pulse occurs in the radio frequency signal based on the marker; and
    wherein the system is configured to determine a downlink propagation delay for the radio system between application of the digital representation of the Gaussian pulse at the digital interface and transmission of the radio frequency signal at the antenna.

13. The system of claim 12, wherein the downlink propagation delay includes intrinsic delay and transmission delay across a communication medium between two components of the radio system.

14. The system of claim 12, wherein the downlink propagation delay includes a first intrinsic delay within the digital interface to the radio system;
   wherein the downlink propagation delay includes a second intrinsic delay within an antenna unit communicatively coupled to the antenna and remotely coupled with the digital interface across a communication medium; and
   wherein the downlink propagation delay further includes a transmission delay across the communication medium between the digital interface and the antenna unit.

15. The system of claim 14, further comprising:
   wherein the system is further configured to determine the transmission delay across the communication medium between the digital interface and the antenna unit; and
   wherein the system is further configured to subtract the transmission delay from the downlink propagation delay to determine a total intrinsic delay including the first intrinsic delay and the second intrinsic delay.

16. The system of claim 12, wherein the waveform generator is configured to provide the marker to the spectrum analyzer via a communication medium separate from the radio system.

17. The system of claim 12, wherein the radio system includes a digital host having the digital interface;
   wherein the radio system includes an antenna unit having the antenna;
   wherein the digital host is communicatively coupled to the antenna unit via a communication medium.

18. The system of claim 17, wherein the digital host is configured to communicate the Gaussian pulse to the antenna unit via the communication medium; and
   wherein the antenna unit is configured to convert the digital representation of the Gaussian pulse to a radio frequency signal transmitted at the antenna.

19. The system of claim 17, wherein the communication medium is at least one of an optical fiber, coaxial cable, and twisted pair.

20. A method for measuring uplink delay in a radio system, comprising:
   applying a Gaussian pulse to a radio frequency signal input at an antenna;
   marking the Gaussian pulse with respect to a frame of digital data with a marker;
   propagating the Gaussian pulse in the radio system to a digital interface of the radio system, the radio system configured to convert the Gaussian pulse to a digital representation of the Gaussian pulse communicated at the digital interface in a digital signal;
   measuring when the Gaussian pulse occurs in the digital signal based on the marker; and
   determining an uplink propagation delay for the radio system between application of the Gaussian pulse to the radio frequency signal input at the antenna and communication of the digital representation of the Gaussian pulse at the digital interface in the digital signal.

21. The method of claim 20, wherein the uplink propagation delay includes intrinsic delay and transmission delay across a communication medium between two components of the radio system.

22. The method of claim 20, wherein the uplink propagation delay includes a first intrinsic delay within an antenna unit communicatively coupled to the antenna and remotely coupled with the digital interface across a communication medium;
   wherein the uplink propagation delay further includes a second intrinsic delay within the digital interface to the radio system; and
   wherein the uplink propagation delay further includes a transmission delay across the communication medium between the antenna unit and the digital interface.

23. The method of claim 22, further comprising:
   measuring the digital transmission delay across the communication medium between the antenna unit and the digital interface; and
   subtracting the digital transmission delay from the uplink propagation delay to determine a total intrinsic delay including the first intrinsic delay and the second intrinsic delay.

24. The method of claim 20, further comprising:
   generating the Gaussian pulse.

25. The method of claim 20, further comprising:
   converting the digital representation of the Gaussian pulse back to the Gaussian pulse.

26. The method of claim 20, wherein measuring when the Gaussian pulse occurs in the digital signal based on the marker occurs using a spectrum analyzer.

27. The method of claim 20, further comprising providing the marker from a first device used to generate the Gaussian pulse to a second device used to analyze the digital signal to determine when the Gaussian pulse occurs.

28. The method of claim 20, wherein propagating the Gaussian pulse in the radio system to the digital interface occurs across an optical fiber.

29. The method of claim 20, wherein the digital interface is part of a host unit;
   wherein the antenna is part of an antenna unit remote to the host unit; and
   wherein the host unit and the antenna unit are communicatively coupled via a wired communication medium.

30. The method of claim 29, wherein the wired communication medium is at least one of an optical fiber, coaxial cable, and twisted pair.

31. A system for measuring uplink delay in a radio system, comprising:
   a waveform generator configured to generate a Gaussian pulse and apply it to an antenna of the radio system;
   wherein the waveform generator is further configured to mark the Gaussian pulse with respect to a frame of digital data with a marker;
   wherein the radio system is configured to propagate the Gaussian pulse and convert the Gaussian pulse to a digital representation of the Gaussian pulse output at a digital interface of the radio system;
   a spectrum analyzer configured to measure when the digital representation of the Gaussian pulse occurs in a digital signal output from the digital interface of the radio system; and
   wherein the system is configured to determine an uplink propagation delay for the radio system between application of the Gaussian pulse at the antenna of the radio system and output of the digital signal at the digital interface of the radio system.

32. The system of claim 31, wherein the uplink propagation delay includes intrinsic delay and transmission delay across a communication medium between two components of the radio system.

33. The system of claim 31, wherein the uplink propagation delay includes a first intrinsic delay within the digital interface to the radio system;
wherein the uplink propagation delay includes a second intrinsic delay within an antenna unit communicatively coupled to the antenna and remotely coupled with the digital interface across a communication medium; and
wherein the uplink propagation delay further includes a transmission delay across the communication medium between the digital interface and the antenna unit.

34. The system of claim 33, further comprising:
wherein the system is further configured to determine the uplink transmission delay across the communication medium between the digital interface and the antenna unit; and
wherein the system is further configured to subtract the uplink transmission delay from the uplink propagation delay to determine a total intrinsic delay including the first intrinsic delay and the second intrinsic delay.

35. The system of claim 31, wherein the waveform generator is configured to provide the marker to the spectrum analyzer via a communication medium separate from the radio system.

36. The system of claim 31, wherein the radio system includes a digital host having the digital interface;
wherein the radio system includes an antenna unit having the antenna;
wherein the digital host is communicatively coupled to the antenna unit via a communication medium.

37. The system of claim 36, wherein the antenna unit is configured to communicate the digital Gaussian pulse to the digital host via the communication medium; and
wherein the antenna unit is configured to convert a radio frequency signal received at the antenna and including the Gaussian pulse to a digital representation of the Gaussian pulse output at the digital interface.

38. The system of claim 36, wherein the communication medium is at least one of an optical fiber, coaxial cable, and twisted pair.

39. A method for measuring delay in a radio system, comprising:
applying a first Gaussian pulse to a radio frequency signal input at an antenna;
marking the first Gaussian pulse with respect to a first frame of digital data with a first marker;
propagating the first Gaussian pulse in the radio system to a digital interface of the radio system, the radio system configured to convert the first Gaussian pulse to a first digital representation of the first Gaussian pulse communicated at the digital interface in a first digital signal;
looping back the first Gaussian pulse in the radio system from the digital interface of the radio system to a radio frequency signal output at the antenna, the radio system configured to convert the first digital representation of the first Gaussian pulse to a first radio frequency signal having the first Gaussian pulse transmitted at the antenna;
measuring when the first Gaussian pulse occurs in the first radio frequency signal based on the first marker; and
determining a round trip propagation delay for the radio system between application of the first Gaussian pulse to the radio frequency signal input at the antenna and communication of the first radio frequency signal having the first Gaussian pulse transmitted at the radio frequency signal output at the antenna.

40. The method of claim 39, further comprising:
applying a second digital representation of a second Gaussian pulse to the digital interface of the radio system;
marking the second digital representation of the second Gaussian pulse with respect to a second frame of digital data with a second marker;
propagating the second Gaussian pulse in the radio system to the antenna, the radio system configured to convert the second digital representation of the second Gaussian pulse to a second radio frequency signal transmitted at the antenna;
measuring when the second Gaussian pulse occurs in the second radio frequency signal based on the second marker; and
determining a downlink propagation delay for the radio system between application of the second digital representation of the second Gaussian pulse at the digital interface and transmission of the second radio frequency signal at the antenna.

41. The method of claim 40, further comprising:
determining an uplink propagation delay for the radio system by subtracting the downlink propagation delay for the radio system from the round trip propagation delay for the radio system.

42. The method of claim 41, wherein the uplink propagation delay includes intrinsic delay and transmission delay across a communication medium between two components of the radio system.

43. The method of claim 41, wherein the uplink propagation delay includes a first uplink intrinsic delay within an antenna unit communicatively coupled to the antenna and remotely coupled with the digital interface across a communication medium;
wherein the uplink propagation delay further includes a second uplink intrinsic delay within the digital interface to the radio system; and
wherein the uplink propagation delay further includes a transmission delay across the communication medium between the antenna unit and the digital interface.

44. The method of claim 43, further comprising:
measuring the digital transmission delay across the communication medium between the antenna unit and the digital interface; and
subtracting the digital transmission delay from the uplink propagation delay to determine a total uplink intrinsic delay including the first uplink intrinsic delay and the second uplink intrinsic delay.

45. The method of claim 39, further comprising:
generating the first Gaussian pulse.

46. The method of claim 39, wherein measuring when the Gaussian pulse occurs in the digital signal based on the marker occurs using a spectrum analyzer.

47. The method of claim 39, further comprising providing the first marker from a first device used to generate the first Gaussian pulse to a second device used to analyze the first radio frequency signal to determine when the first Gaussian pulse occurs.

48. The method of claim 39, wherein propagating the Gaussian pulse in the radio system to the digital interface occurs across an optical fiber.

49. The method of claim 39, wherein the digital interface is part of a host unit;
wherein the antenna is part of an antenna unit remote to the host unit; and
wherein the host unit and the antenna unit are communicatively coupled via a wired communication medium.

50. The method of claim 49, wherein the wired communication medium is at least one of an optical fiber, coaxial cable, and twisted pair.

51. A system for measuring delay in a radio system, comprising:
a first waveform generator configured to generate a first Gaussian pulse and to apply the first Gaussian pulse to an antenna of the radio system;
wherein the first waveform generator is further configured to mark the first Gaussian pulse with respect to a first frame of digital data with a first marker;
wherein the radio system is configured to propagate the first Gaussian pulse and convert the first Gaussian pulse to a first digital representation of the first Gaussian pulse output at a digital interface of the radio system;
wherein the radio system is further configured to loop back the first Gaussian pulse in the radio system from the digital interface of the radio system to a radio frequency signal output at the antenna and to convert the first digital representation of the first Gaussian pulse to a first radio frequency signal having the first Gaussian pulse transmitted at the antenna;
a spectrum analyzer configured to measure when the first Gaussian pulse occurs in the first radio frequency signal output at the antenna based on the first marker;
wherein the system is configured to determine a round trip propagation delay for the radio system between application of the first Gaussian pulse to the radio frequency signal input at the antenna and communication of the first radio frequency signal having the first Gaussian pulse transmitted at the radio frequency signal output at the antenna.

52. The system of claim 51, further comprising:
a second digital waveform generator configured to generate a second digital representation of a second Gaussian pulse and to apply the second digital representation of the second Gaussian pulse to the digital interface of the radio system;
wherein the second waveform generator is further configured to mark the second digital representation of the second Gaussian pulse with respect to a second frame of digital data with a second marker;
wherein the radio system is further configured to propagate the second Gaussian pulse in the radio system to the antenna, the radio system configured to convert the second digital representation of the second Gaussian pulse to a second radio frequency signal transmitted at the antenna;
wherein the spectrum analyzer is configured to measure when the second Gaussian pulse occurs in the second radio frequency signal based on the second marker; and
wherein the radio system is further configured to determine a downlink propagation delay for the radio system between application of the second digital representation of the second Gaussian pulse at the digital interface and transmission of the second radio frequency signal at the antenna.

53. The system of claim 52, further comprising:
wherein the radio system is further configured to determine an uplink propagation delay for the radio system by subtracting the downlink propagation delay for the radio system from the round trip propagation delay for the radio system.

54. The system of claim 53, wherein the uplink propagation delay includes intrinsic delay and transmission delay across a communication medium between two components of the radio system.

55. The system of claim 53, wherein the uplink propagation delay includes a first uplink intrinsic delay within an antenna unit communicatively coupled to the antenna and remotely coupled with the digital interface across a communication medium;
wherein the uplink propagation delay further includes a second uplink intrinsic delay within the digital interface to the radio system; and
wherein the uplink propagation delay further includes a transmission delay across the communication medium between the antenna unit and the digital interface.

56. The system of claim 55, further comprising:
wherein the radio system is further configured to measure the digital uplink transmission delay across the communication medium between the antenna unit and the digital interface; and
wherein the radio system is further configured to subtract the digital uplink transmission delay from the uplink propagation delay to determine a total uplink intrinsic delay including the first uplink intrinsic delay and the second uplink intrinsic delay.

57. The system of claim 51, wherein the first waveform generator is further configured to provide the first marker to the spectrum analyzer to determine when the first Gaussian pulse occurs.

58. The system of claim 51, wherein the digital interface is part of a host unit;
wherein the antenna is part of an antenna unit remote to the host unit; and
wherein the host unit and the antenna unit are communicatively coupled via a wired communication medium.

59. The system of claim 58, wherein the wired communication medium is at least one of an optical fiber, coaxial cable, and twisted pair.

* * * * *